(12) United States Patent
Elwell, Jr. et al.

(10) Patent No.: US 8,279,119 B2
(45) Date of Patent: Oct. 2, 2012

(54) SYSTEMS AND METHODS FOR TRANSPARENCY MAPPING USING MULTIPATH SIGNALS

(75) Inventors: John M. Elwell, Jr., Sudbury, MA (US); Donald E. Gustafson, Lexington, MA (US); J. Arnold Soltz, Brookline, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 377 days.

(21) Appl. No.: 12/212,480

(22) Filed: Sep. 17, 2008

(65) Prior Publication Data
US 2009/0102711 A1  Apr. 23, 2009

Related U.S. Application Data

(63) Continuation-in-part of application No. 11/335,160, filed on Jan. 19, 2006, now Pat. No. 7,679,561.

(60) Provisional application No. 60/645,390, filed on Jan. 19, 2005, provisional application No. 60/973,314, filed on Sep. 18, 2007, provisional application No. 60/977,519, filed on Oct. 4, 2007.

(51) Int. Cl.
*G01S 5/04* (2006.01)
*G01S 19/22* (2010.01)
*H04B 7/185* (2006.01)

(52) U.S. Cl. .................... 342/453; 342/353; 342/357.61

(58) Field of Classification Search .................. 342/353, 342/453, 357.61
See application file for complete search history.

(56) References Cited

U.S. PATENT DOCUMENTS

| | | | |
|---|---|---|---|
| 3,537,008 | A | 10/1970 | Lakatos |
| 3,869,673 | A | 3/1975 | Close |
| 4,433,334 | A | 2/1984 | Caputi, Jr. |
| 4,667,202 | A | 5/1987 | Kammerlander et al. |
| 4,675,880 | A | 6/1987 | Davarian |
| 4,812,991 | A | 3/1989 | Hatch |
| 4,888,593 | A | 12/1989 | Friedman et al. |
| 4,916,455 | A | 4/1990 | Bent et al. |
| 4,975,710 | A | 12/1990 | Baghdady |
| 5,063,560 | A | 11/1991 | Yerbury et al. |
| 5,216,429 | A | 6/1993 | Nakagawa et al. |
| 5,293,642 | A | 3/1994 | Lo |
| 5,296,861 | A | 3/1994 | Knight |

(Continued)

FOREIGN PATENT DOCUMENTS

EP   1143652   10/2001

(Continued)

OTHER PUBLICATIONS

Balboni et al., "An Empirical Study of Radio Propagation Abroad Naval Vessels," Proceedings of Antennas and Propagation for WirelessCommunications, Nov. 6-8, 2000, 4 pgs.

(Continued)

*Primary Examiner* — Gregory C Issing
(74) *Attorney, Agent, or Firm* — Goodwin Procter LLP

(57) ABSTRACT

Systems and methods for mapping a structure detect wireless signals, including at least one multipath signal that has experienced at least one reflection against a portion of the structure prior to the detection. The wireless signals are analyzed to estimate reflection points for the multipath signal(s), and a map of at least the portion of the structure is generated based on the estimated reflection points.

31 Claims, 15 Drawing Sheets

U.S. PATENT DOCUMENTS

| | | |
|---|---|---|
| 5,347,286 A | 9/1994 | Babitch |
| 5,390,339 A | 2/1995 | Bruckert et al. |
| 5,414,432 A | 5/1995 | Penny, Jr. et al. |
| 5,414,729 A | 5/1995 | Fenton et al. |
| 5,590,043 A | 12/1996 | McBurney |
| 5,592,180 A | 1/1997 | Yokev et al. |
| 5,606,732 A | 2/1997 | Vignone, Sr. |
| 5,608,411 A | 3/1997 | Rose |
| 5,623,429 A * | 4/1997 | Fortune et al. .................... 703/3 |
| 5,630,208 A | 5/1997 | Enge et al. |
| 5,646,964 A | 7/1997 | Ushirokawa et al. |
| 5,689,431 A | 11/1997 | Rudow et al. |
| 5,689,812 A * | 11/1997 | Takahashi .................. 455/67.16 |
| 5,710,977 A | 1/1998 | Nakazawa et al. |
| 5,717,406 A | 2/1998 | Sanderford et al. |
| 5,719,584 A | 2/1998 | Otto |
| 5,724,047 A | 3/1998 | Lioio et al. |
| 5,726,659 A | 3/1998 | Kee et al. |
| 5,740,049 A | 4/1998 | Kaise et al. |
| 5,745,075 A | 4/1998 | Enge et al. |
| 5,760,909 A | 6/1998 | Nichols |
| 5,771,456 A | 6/1998 | Pon |
| 5,796,773 A | 8/1998 | Sheynblat |
| 5,815,539 A | 9/1998 | Lennen |
| 5,828,694 A | 10/1998 | Schipper |
| 5,883,595 A | 3/1999 | Colley |
| 5,883,817 A | 3/1999 | Chisholm et al. |
| 5,903,597 A | 5/1999 | Pon |
| 5,917,445 A | 6/1999 | Schipper et al. |
| 5,918,161 A | 6/1999 | Kumar et al. |
| 5,926,113 A | 7/1999 | Jones et al. |
| 5,926,133 A | 7/1999 | Green, Jr. |
| 5,936,573 A | 8/1999 | Smith |
| 5,949,364 A * | 9/1999 | Katzberg et al. ............ 342/25 A |
| 5,950,140 A | 9/1999 | Smith |
| 5,963,601 A | 10/1999 | Pon et al. |
| 5,974,039 A | 10/1999 | Schilling |
| 5,982,322 A | 11/1999 | Bickley et al. |
| 5,986,575 A | 11/1999 | Jones et al. |
| 5,991,345 A | 11/1999 | Ramasastry |
| 5,999,131 A | 12/1999 | Sullivan |
| 6,002,361 A | 12/1999 | Schipper |
| 6,026,304 A | 2/2000 | Hilsenrath et al. |
| 6,031,601 A | 2/2000 | McCusker et al. |
| 6,031,881 A | 2/2000 | Weill et al. |
| 6,054,950 A | 4/2000 | Fontana |
| 6,061,022 A | 5/2000 | Menegozzi et al. |
| 6,078,788 A | 6/2000 | Haardt et al. |
| RE36,791 E | 7/2000 | Heller |
| 6,084,546 A | 7/2000 | Wax et al. |
| 6,084,927 A | 7/2000 | Pon |
| 6,094,168 A | 7/2000 | Duffett-Smith et al. |
| 6,112,095 A | 8/2000 | Wax et al. |
| 6,114,989 A | 9/2000 | Fontes et al. |
| 6,150,921 A | 11/2000 | Werb et al. |
| 6,150,979 A | 11/2000 | Tsui |
| 6,163,297 A | 12/2000 | Rose |
| 6,198,765 B1 | 3/2001 | Cahn et al. |
| 6,232,922 B1 * | 5/2001 | McIntosh ...................... 342/453 |
| 6,233,459 B1 | 5/2001 | Sullivan et al. |
| 6,236,365 B1 | 5/2001 | LeBlanc et al. |
| 6,243,648 B1 | 6/2001 | Kilfeather et al. |
| 6,255,992 B1 | 7/2001 | Madden |
| 6,259,401 B1 | 7/2001 | Woo |
| 6,259,404 B1 | 7/2001 | Parl et al. |
| 6,263,208 B1 | 7/2001 | Chang et al. |
| 6,272,350 B1 | 8/2001 | Tekinay |
| 6,282,426 B1 | 8/2001 | Wang |
| 6,285,318 B1 | 9/2001 | Schoen et al. |
| 6,292,665 B1 | 9/2001 | Hildebrand et al. |
| 6,300,903 B1 | 10/2001 | Richards et al. |
| 6,362,782 B1 | 3/2002 | Greenspan et al. |
| 6,408,186 B1 | 6/2002 | Park et al. |
| 6,414,634 B1 | 7/2002 | Tekinay |
| 6,473,038 B2 | 10/2002 | Patwari et al. |
| 6,522,296 B2 | 2/2003 | Holt |
| 6,541,950 B2 | 4/2003 | Townsend et al. |
| 6,580,393 B2 | 6/2003 | Holt |
| 6,593,883 B2 | 7/2003 | Johnson et al. |
| 6,608,593 B2 | 8/2003 | Holt |
| 6,611,232 B1 | 8/2003 | Wunderlich et al. |
| 6,634,959 B2 | 10/2003 | Kuesters |
| 6,693,592 B2 * | 2/2004 | Dowdle et al. ................ 342/453 |
| 6,744,408 B1 * | 6/2004 | Stockmaster ................ 342/453 |
| 6,744,442 B1 | 6/2004 | Chan et al. |
| 6,745,038 B2 | 6/2004 | Callaway, Jr. et al. |
| 6,795,019 B2 | 9/2004 | Holt |
| 6,892,055 B2 | 5/2005 | Rosenfeld et al. |
| 6,900,758 B1 | 5/2005 | Mann et al. |
| 6,934,626 B2 | 8/2005 | Tingley |
| 7,064,660 B2 * | 6/2006 | Perkins et al. .......... 340/539.13 |
| 7,205,933 B1 | 4/2007 | Snodgrass |
| 7,212,159 B2 | 5/2007 | Dooley |
| 7,212,160 B2 * | 5/2007 | Bertoni et ..................... 342/453 |
| 7,313,403 B2 | 12/2007 | Gong et al. |
| 7,492,314 B2 * | 2/2009 | DiEsposti et al. ....... 342/357.61 |
| 2002/0050944 A1 | 5/2002 | Sheynblat et al. |
| 2002/0089450 A1 | 7/2002 | Dowdle et al. |
| 2002/0196186 A1 | 12/2002 | Holt |
| 2002/0196187 A1 | 12/2002 | Holt |
| 2002/0196188 A1 | 12/2002 | Holt |
| 2003/0052821 A1 | 3/2003 | Holt |
| 2003/0069024 A1 | 4/2003 | Kennedy |
| 2005/0179591 A1 | 8/2005 | Bertoni et al. |
| 2008/0198072 A1 | 8/2008 | Elwell et al. |

FOREIGN PATENT DOCUMENTS

| | | |
|---|---|---|
| JP | 2000346655 | 12/2000 |
| JP | 2001272450 | 10/2001 |
| WO | WO-0181941 | 11/2001 |
| WO | WO-02052225 | 7/2002 |
| WO | WO-03096055 | 11/2003 |
| WO | WO 2006088599 A1 * | 8/2006 |

OTHER PUBLICATIONS

Drane et al., "Positioning GSM Telephones," IEEE Communications Magazine, Apr. 1998, pp. 46-59.

Gustafson et al., "Indoor Geolocation and Mapping Using RF Multipath," Charles Stark Draper Laboratory, Cambridge, MA, DARPA Urban Propagation Workshop, San Diego, CA, Oct. 5, 2006, 23 pages.

Gustafson et al., "Innovative Indoor Geolocation Using RF Multipath Diversity," Contract No. FA8650-06-C-7642, CWINS & Draper Proprietary, Feb. 27, 2007, 81 pages.

Howard et al., "Measurement and Analysis of the Indoor Radio Channel in the Frequency Domain," IEEE Transactions on Instrumentation and Measurement, vol. 39, No. 5, Oct. 1990, pp. 751-755.

Krishnamurthy, "Analysis and Modeling of the Wideband Radio Channel for Indoor Geolocation Applications," Ph.D. Dissertation, Worcester Polytechnic Institute, Aug. 2, 1999, 172 pages.

Pahlavan et al., "Indoor Geolocation Science and Technology," IEEE Communications Magazine, Feb. 2002, pp. 112-118.

Pahlavan et al., "Wideband Radio Propagation Modeling for Indoor Geolocation Applications," IEEE Communications Magazine, Apr. 1998, pp. 60-65.

Peterson et al., "Measuring GPS Signals Indoors," The British Library, previously published at the U.S. Institute of Navigation Conference, ION GPS '97, Sep. 1997, 8 pages.

Rappaport et al., "Position Location Using Wireless Communications on Highways of the Future," IEEE Communications Magazine, Oct. 1996, pp. 33-41.

Tingley et al, "A Comparison of Two Techniques for Parameter Estimation of an Indoor Radio Channel," Proceedings of Wireless '99, Calgary, Alberta, Canada, Jul. 12-14, 1999, pp. 94-101.

Turin, "Introduction to Spread-Spectrum Antimultipath Techniques and Their Application to Urban Digital Radio," IEEE Proceedings, vol. 68, No. 3, Mar. 1980, pp. 328-353.

Watson et al., "Investigating GPS Signals Indoors with Extreme High-Sensitivity Detection Techniques," Journal of the Institute of Navigation, vol. 52, No. 4, Winter 2005-2006, received Jun. 2005, revised Feb. 2006, pp. 199-213.

Werb et al., "Designing a Positioning System for Finding Things and People Indoors," IEEE Spectrum, Sep. 1998, pp. 71-78.

Yousef et al., "Robust Time-Delay and Amplitude Estimation for CDMA Location Finding," IEEE Proceedings of the Vehicular Technology Conference, Fall 1999, vol. 4, Delft, The Netherlands, Sep. 1999, pp. 2163-2167.

International Search Report for PCT Application No. PCT/US06/001811, mailed Jun. 19, 2006, 2 pages.

Written Opinion for PCT Application No. PCT/US06/001811, mailed Jun. 19, 2006, 5 pages.

Examination Report for European Patent Application No. 06748164.8, mailed Mar. 19, 2009, 3 pages.

International Search Report for PCT Application No. PCT/US2008/076652, mailed Jun. 4, 2009, 3 pages.

Written Opinion for PCT Application No. PCT/US2008/076652, mailed Jun. 4, 2009, 6 pages.

* cited by examiner

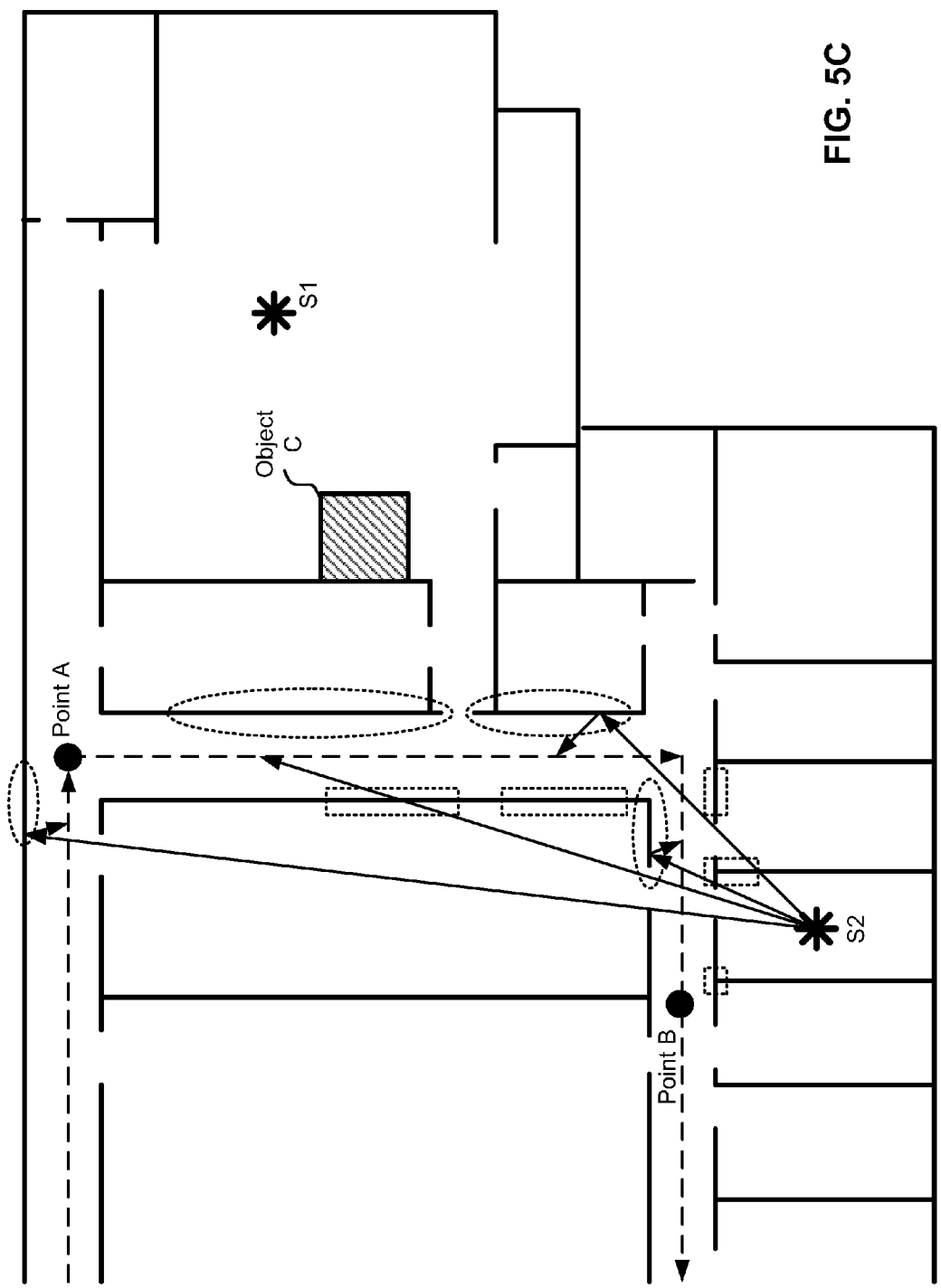

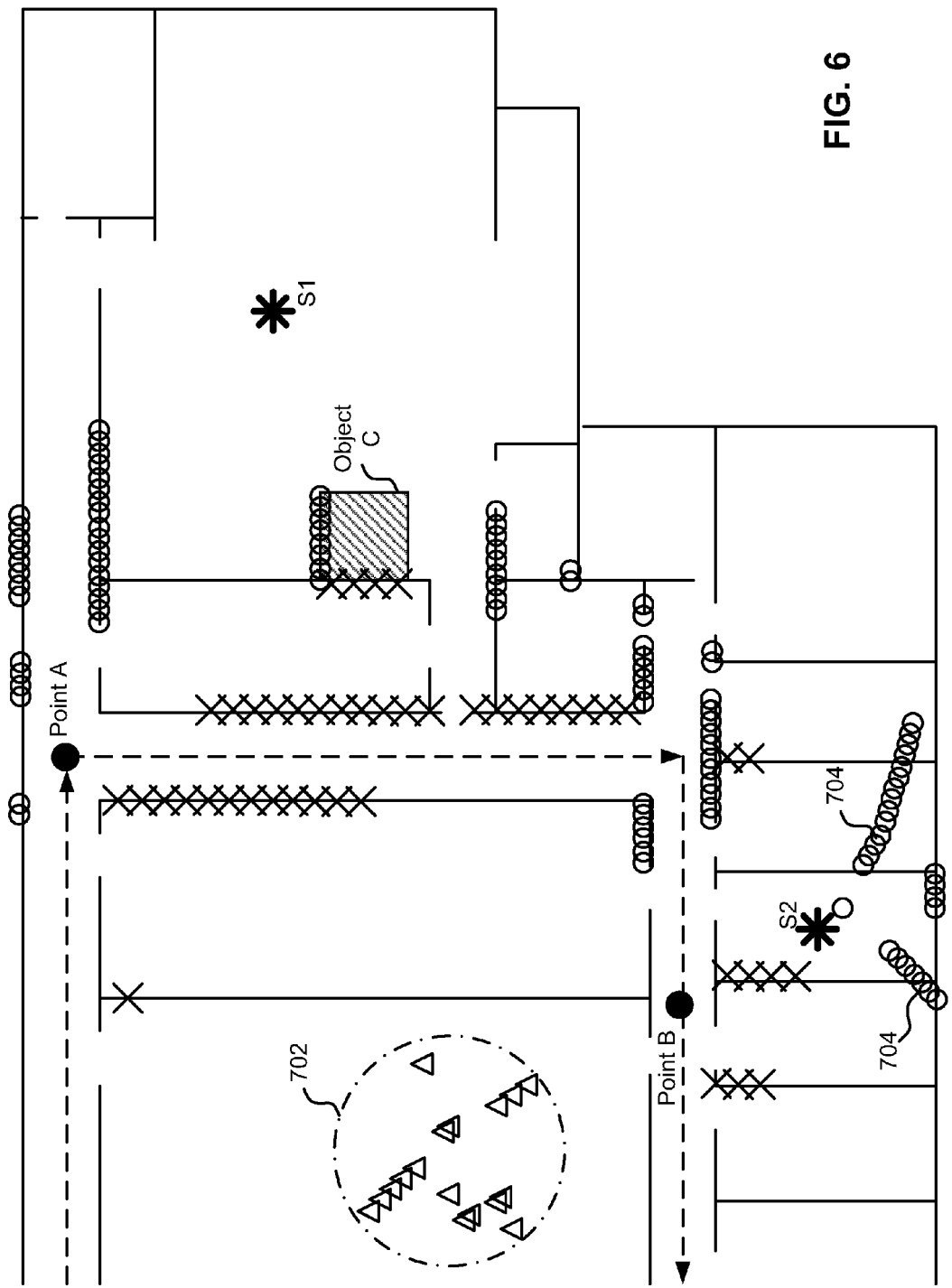

SYSTEMS AND METHODS FOR TRANSPARENCY MAPPING USING MULTIPATH SIGNALS

CROSS-REFERENCE TO RELATED CASES

This application claims priority to and the benefit of U.S. Provisional Patent Application No. 60/977,519, filed on Oct. 4, 2007, which is incorporated by reference as if set forth herein in its entirety.

This application also claims priority to and the benefit of U.S. Provisional Patent Application No. 60/973,314, filed on Sep. 18, 2007, which is incorporated by reference as if set forth herein in its entirety.

This application is also a continuation-in-part of U.S. patent application Ser. No. 11/335,160, filed on Jan. 19, 2006, which is incorporated by reference as if set forth herein in its entirety.

This application also incorporates by reference the disclosure of U.S. Pat. No. 6,693,592, issued on Feb. 17, 2004, as if set forth herein in its entirety.

This application further incorporates by reference the disclosure of U.S. Pat. No. 6,934,626, issued on Aug. 23, 2005, as if set forth herein in its entirety.

FIELD OF THE INVENTION

In various embodiments, the present invention relates to mapping techniques, and more specifically to systems and methods for transparency mapping using multipath signals, such as remote interior and exterior three-dimensional transparency mapping of urban environments and building structures.

BACKGROUND OF THE INVENTION

With conventional mapping techniques, an observer (or his equipment) typically has to have a direct line of sight to an object to be mapped. If a portion of the object is out of sight, it may not be represented in a final map generated with the conventional techniques. This is true for existing mapping techniques such as land survey (with total stations), photomapping, photogrammetry, and remote sensing methods.

Many remote-sensing exterior mapping techniques rely on direct reflection of radio-frequency (RF) signals, microwave signals, or other type of signals to detect the presence of objects and to map their locations. For example, an RF signal may be transmitted from a source and directed towards an area of interest, and objects in that area may reflect the RF signal back towards the source. The reflected signals can be collected at the signal source and their time of arrival (TOA) may be used as a basis for determining a relative distance between the source and the reflective objects. This is the general operating principle for radar and sonar. More complex operations might employ two or more transceivers to triangulate object locations.

These remote-sensing mapping techniques, however, suffer from a number of deficiencies. For example, to be accounted for in a final map, an object generally must be within line of sight of at least one transceiver. Even within line of sight, object surfaces that do not reflect a transceiver's signal directly back to that transceiver are effectively "invisible" to the transceiver and therefore will not be charted in the map. Typically, anything other than narrow-angled, single-reflection signals is either not detected or filtered out as noise. As a result, a substantial portion of signals that bounce off an object end up not contributing any geometric information to the final map.

In mapping techniques that are based on a coordinated deployment of signal source(s) and receiver(s), one or more receivers (e.g., transponder tags) may move across an area of interest and simultaneously detect signals from one or more sources. Based on the detected signals, the receivers' coordinates at different locations in the area may be calculated and synthesized into a map. Again, the receiver or tag must typically have a direct line of sight to the signal source(s) in order to accurately determine its own location. In a cluttered environment, such as an urban canyon or an enclosed structure, the receiver or tag may lose direct sight of signals, making it difficult to use direct-path signals for mapping. In this approach, the reflected signals are typically treated as unwanted noise.

Therefore, it has been difficult, if not impossible, to employ conventional mapping techniques in a cluttered environment, such as an urban canyon, or an enclosed structure, such as a building. Such environment or structures tend to generate multipath signals (i.e., signals experiencing one or more reflections between source and detection), making it difficult to rely on direct-path signals alone for the mapping. FIG. 1 illustrates exterior mapping for an exemplary urban environment cluttered with Buildings A, B and C. TC1 and TC2 are two externally located RF transceivers, which may be fixed or mobile transceiver devices. As illustrated in FIG. 1, it may be difficult to employ TC1 and TC2 to map Building C based on existing mapping techniques. Since Buildings A and B are much taller than Building C, the transceivers TC1 and TC2 may have a difficult time gaining an unobstructed sight of Building C. Thus, it is difficult for either TC1 or TC2 to detect any RF signal reflected by Building C. In addition, RF signals from TC1 and TC2 may be reflected one or more times by Buildings A and B (or other objects) before reaching Building C. Therefore, it is also difficult for RF receivers or transponding devices placed on, near or inside Building C to detect direct-path RF signals from TC1 or TC2. In these circumstances, the existing mapping approaches would be incapable of mapping the exterior or interior of Building C, because those approaches either cannot fully exploit geometric information in multipath signals or simply discard multipath signals as unwanted noise. Signals reflecting from the interior surfaces of the building structures are even more difficult to incorporate into the overall mapping process for the same reasons.

Accordingly, there is a need for improved systems and methods that can map a cluttered environment, such as an urban canyon, or an enclosed structure, such as a building, without the aforementioned problems or deficiencies.

SUMMARY OF THE INVENTION

In various embodiments, the present invention relates to systems and methods for mapping a cluttered environment, such as an urban canyon, or an enclosed structure, such as a building. The structure-penetrating capability of many RF signals can provide information about interior surface distances as well as building exterior surface distances. The exemplary systems and methods described herein recognize that substantial information is available in multipath signals even when a direct-path signal is absent or undetected.

One object of the invention is to use radio frequency (RF) signals or other wireless signals to map a cluttered exterior or interior environment, wherein multipath signals may be analyzed to identify objects or surfaces not in direct line of sight to a signal source or a receiver.

In general, in one aspect, embodiments of the invention feature a method for mapping a structure. The method may include: detecting, at a receiver, a first wireless signal transmitted directly from a satellite; deriving, from the first wireless signal, a location of the satellite; detecting, at the receiver, a second wireless signal transmitted by the satellite and reflected by a structure; determining a time difference of arrival (TDOA) between the second wireless signal and the first wireless signal; and mapping at least one reflection point associated with the structure. The mapping may be based on the TDOA, a location of the receiver, and the location of the satellite.

In general, in another aspect, embodiments of the invention feature a system for mapping a structure. The system may include a receiver at a known location and one or more signal processing elements operatively coupled to the receiver. The receiver and the signal processing elements may be configured to: (i) detect a first wireless signal transmitted directly from a satellite, (ii) derive, from the first wireless signal, a location of the satellite, (iii) detect a second wireless signal transmitted by the satellite and reflected by a structure, (iv) determine a time difference of arrival (TDOA) between the second wireless signal and the first wireless signal, and (v) map at least one reflection point associated with the structure. The mapping may be based on the TDOA, the location of the receiver, and the location of the satellite.

In various embodiments, the receiver and the signal processing elements are further configured to derive, from the first wireless signal, a code sequence and a data message. The receiver and the signal processing elements may also be configured to perform data wiping and coherent integration on the second wireless signal before determining the TDOA. In another embodiment, the receiver and the signal processing elements are configured to: (i) detect a signal having the first wireless signal and the second wireless signal mixed together; (ii) synthesize a replica of the detected signal by varying a first delay applied to the code sequence and mixing the resulting delayed code sequence with the code sequence until the resulting mixed code sequence matches the detected signal; and (iii) correlate the replica with the detected signal by varying a second delay applied to the replica until a correlation peak occurs between the delayed replica and the detected signal.

In still another embodiment, a plurality of first wireless signals and a plurality of second wireless signals both originating from one or more satellites may be detected, and the receiver and the signal processing elements may be further configured to (i) isolate, from the pluralities of wireless signals, a subset of wireless signals that originate from a same satellite and (ii) identify, from the subset of wireless signals, a direct path signal and at least one corresponding multipath signal that has reflected off of the structure. In addition, the receiver and the signal processing elements may be further configured to determine a delay between the at least one corresponding multipath signal and the direct path signal.

In general, in yet another aspect, embodiments of the invention feature another method for mapping a structure. The method includes detecting a plurality of wireless signals that comprise at least one multipath signal that has experienced at least one reflection against a portion of a structure prior to the detection. The plurality of wireless signals may be received from one or more sources and be detected with at least one receiver. The method may also include analyzing the plurality of wireless signals to estimate reflection points for the at least one multipath signal. In addition, the method may include generating a map of at least the portion of the structure based on the estimated reflection points.

In general, in still another aspect, embodiments of the invention feature another system for mapping a structure. The system includes at least one receiver for detecting a plurality of wireless signals originating from one or more sources. The plurality of wireless signals include at least one multipath signal that has experienced at least one reflection against a portion of a structure prior to the detection. The system may also include a processor, associated with the at least one receiver, for i) analyzing the plurality of wireless signals to estimate reflection points for the at least one multipath signal and ii) generating a map of at least the portion of the structure based on the estimated reflection points.

The one or more sources may include, for example, one or more mobile transmitters (such as satellites moving in space), or at least two transmitters at known terrestrial locations. The at least one receiver may move along a known trajectory within or near the structure, or it may move along an unknown trajectory within or near the structure and the system may be configured to track a location of the receiver. Tracking the location of the receiver and generating the map may take place at substantially the same time and in recursive steps.

In one embodiment, the system also includes a Rake filter for processing a multipath signal in order to correlate the multipath signal with a corresponding direct path signal. The processor may be configured to (i) determine a time delay between the multipath signal and the corresponding direct path signal and (ii) estimate one or more parameters associated with a multipath delay model. In another embodiment, the receiver is configured to assign one of the plurality of wireless signals to a corresponding signal path. The processor may be further configured to distinguish the at least one multipath signal from a corresponding direct-path signal, to associate the at least one multipath signal with a corresponding direct-path signal, to iteratively estimate one or more multipath parameters associated with a multipath delay model, to distinguish single-reflection multipath signals from multiple-reflection multipath signals, to identify one or more true reflection surfaces responsible for producing the at least one multipath signal based on a statistical inference, and/or to eliminate one or more erroneous mapping points that result from a proximity effect. The one or more multipath parameters for a multipath signal may include an angle-of-arrival from a last reflection experienced by the multipath signal. According to still another embodiment, generating the map may be based on both direct-path signals and multipath signals in the plurality of wireless signals.

The foregoing and other features and advantages of the present invention will be made more apparent from the description, drawings, and claims that follow.

BRIEF DESCRIPTION OF DRAWINGS

The advantages of the invention may be better understood by referring to the following drawings taken in conjunction with the accompanying description.

FIGS. 5A-C show a floor plan of a building to illustrate one exemplary method for mapping using multipath signals in accordance with an embodiment of the present invention.

FIG. 6 shows a floor plan of a building to illustrate exemplary mapping simulation results using multipath signals in accordance with an embodiment of the present invention.

In the drawings, like reference characters generally refer to corresponding parts throughout the different views. The drawings are not necessarily to scale, emphasis instead being placed on illustrating the principles and concepts of the invention.

DETAILED DESCRIPTION OF THE INVENTION

A. The Exploitation of Multipath Signals

Figure 1:
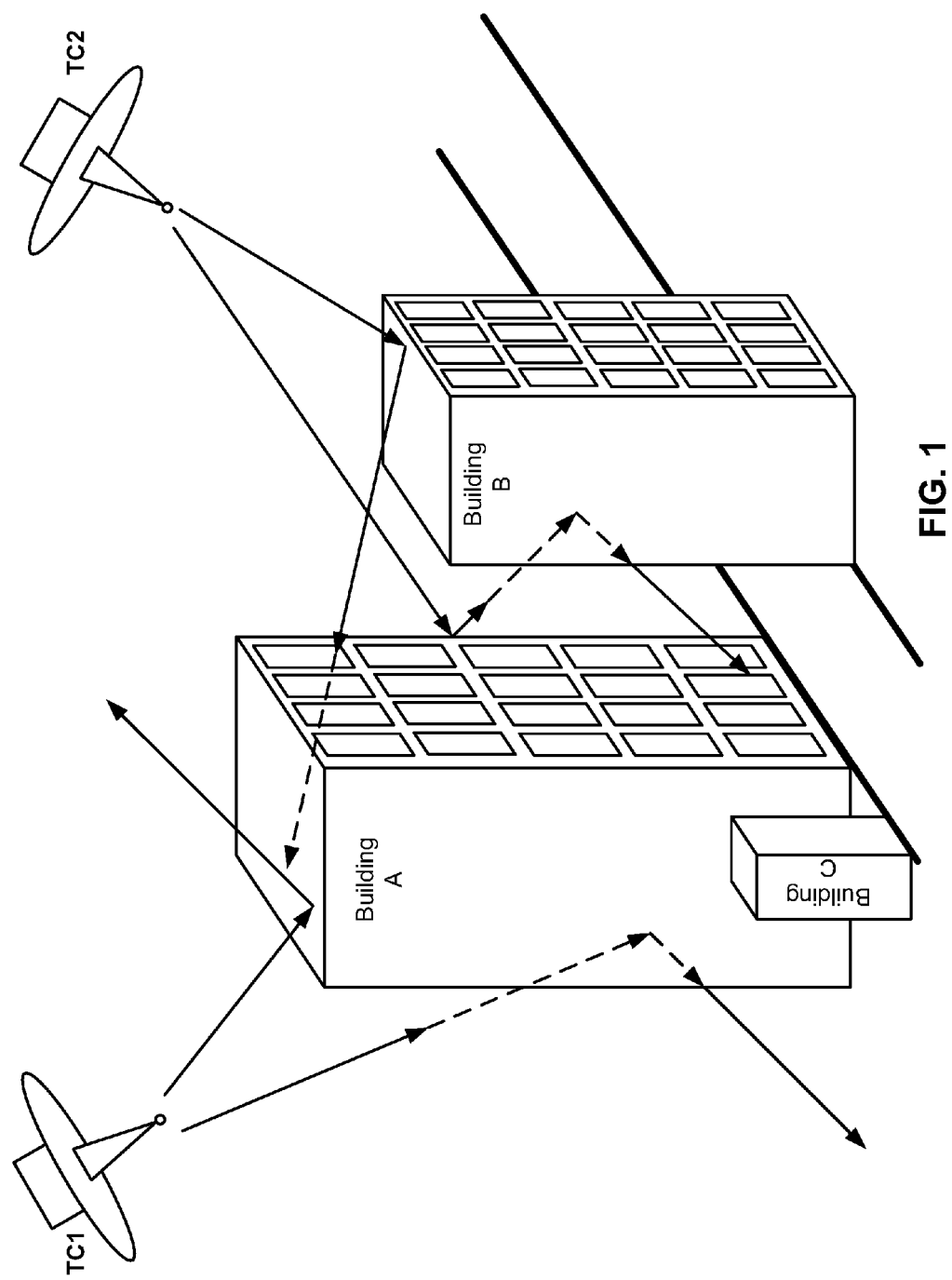
FIG. 1 illustrates exterior mapping for an exemplary urban environment cluttered with Buildings A, B and C.

In brief overview, embodiments of the present invention provide signal detection and processing techniques for indoor or transparency mapping applications. Rather than treating multipath signals as noise and attempting to mitigate multipath-induced errors, these techniques decode and exploit geometric information within multipath signals. Embodiments of the present invention rely on well-established wireless signal transmission and receiving means to perform two-dimensional (2-D) and/or three-dimensional (3-D) mapping of cluttered outdoor and/or indoor environments. In a generalized setting, one or more signal sources may be configured to transmit signals at known locations within or near an indoor or outdoor environment, while one or more receivers (e.g., detectors or transponding tags) may receive the resultant wireless signals within or near the environment. The signal sources may be transmitters at fixed or variable locations within or near a building. The receivers may be moving along a certain trajectory or be in a fixed position inside or outside the building.

Typically, at least one of the signal sources or the receiver is in (scanning) motion to provide some perspective of the mapped object. Wireless signals received by a receiver may include both direct-path and indirect path (i.e., multipath, reflected) signals. In one embodiment, the multipath time-of-arrival or time-of-flight measurements are processed with a parametric model of indirect path length (or a multipath delay model) which contains angle-of-arrival as well as distance information. The parametric model is developed by ray-tracing one or multiple reflective paths and is based on the geometry of ideal specular reflections. With the parametric model, estimated locations of the last reflection points are calculated. True RF reflection surfaces (facets) can be established by statistically distinguishing single-reflection paths from multiple reflection paths. The estimated reflection points and facets, as well as a priori information (e.g., partial map), if any, can then be synthesized to provide geometric details of a cluttered environment. The direct-path time-of-flight measurement is useful for establishing a current position of the receiver and to initialize multipath parameters.

Embodiments of the invention have potentially important commercial and military applications. These include, for example: (1) providing real-time indoor infrastructure information to first responders (e.g., policemen, firemen, and anti-terrorist personnel) when maps may not exist or may have changed due to fire/explosions, etc.; and (2) efficient and inexpensive real-time mapping of warehouses, hospitals, etc. (including updating of current maps to address recent movement of significant objects such as large equipment, storage cabinets, etc.). In both scenarios, the indoor infrastructure or layout may have recently changed, rendering current maps obsolete; in this case, the real-time capability of the exemplary embodiments described herein allows timely updating of the maps.

In connection with these developments, it has been determined that the indirect-path distance for specular reflections from planar surfaces can be modeled using only two parameters in two dimensions and three parameters in three dimensions, no matter the number of specular reflections. Using this model, as discussed in more detail below, relevant parameters may be estimated in real time or in batch, thereby providing a basis for establishing reflection points.

B. Multipath Mapping Concept

In one embodiment of the multipath mapping concept, one or more Rake filters (or similar or equivalent means) are used to isolate a direct-path signal and its corresponding multipath signals. In another embodiment, time delay measurements of the direct and indirect multipath signals are processed using one or more of data association, initialization, parameter estimation, and tracking filters. A data association algorithm may be used to enhance tracking of intermittent direct and indirect path measurements. In yet another embodiment, a particle filter is used to reduce the initial receiver position uncertainty to a region where an extended Kalman filter can be used for both indirect path parameter estimation and tracking. In further embodiments, dead-reckoning sensors or other navigation aids are used to slow error growth in measurements or to aid in the data association process.

Figure 2A:
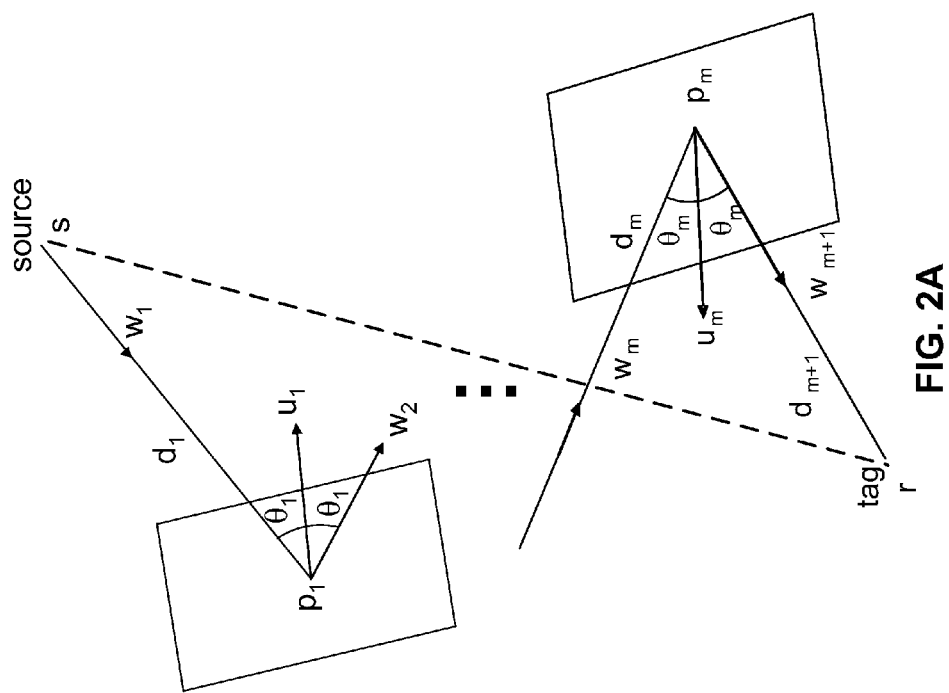
FIGS. 2A-C illustrate the geometry associated with one or more specular reflections in accordance with embodiments of the present invention.
Figure 2C:
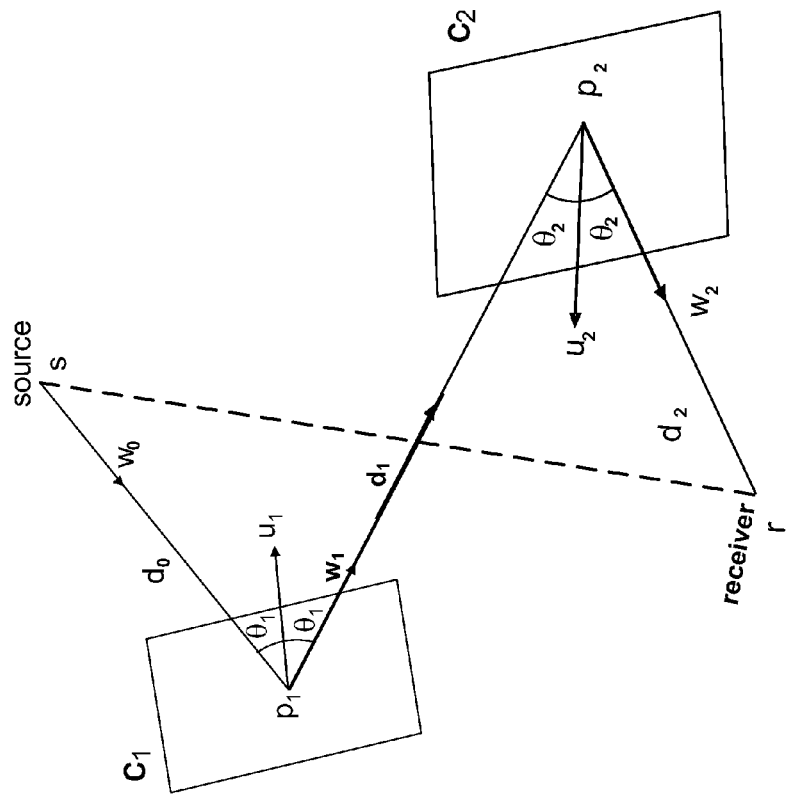
Figure 2B:
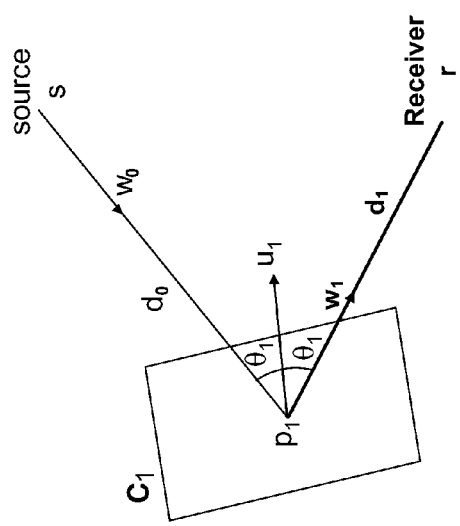

FIGS. 2A-C illustrate the geometry associated with one or more specular reflections in accordance with embodiments of the present invention. As shown in FIG. 2A, a wireless signal may be transmitted initially from a source s and experience multiple specular reflections before being detected by a receiver r.

With reference to FIG. 2B, which shows a single specular reflection, the derivation of a multipath delay model may begin by assuming ideal specular reflection from a single planar surface. The following equation describes the relation between indirect path length $\tau = d_0 + d_1$ and receiver location vector r:

$$\tau w_1 = r + E_1 s - 2u_1 c_1$$

where $w_1$ is a unit vector; s is the location of the signal source; $u_1$ is the unit vector defining the reflecting plane orientation; $c_1$ is the scalar satisfying $u_1^T r_p = c_1$, such that $r_p$ is any point in the reflecting plane; and $E_1 = 2u_1 u_1^T - I$, which represents the transformation (or reflection) matrix associated with the reflection plane (and where I is the identity matrix).

Assuming that the reflecting plane and the source s are fixed, the indirect path length at time t satisfies:

$$\tau(t)w_1(t) = r(t) + E_1 s - 2u_1 c_1 \equiv r(t) + \rho_0$$

wherein $\rho_0$ is constant. Thus:

$$\tau(t) = w_1^T(t)[r(t) + \rho_0] \equiv w_1^T(t)r(t) + \tau_0(t) \quad (1)$$

If the signal source is not too close to the reflecting plane, then the four multipath parameters $w_1(t)$ (i.e., a vector including three parameters) and $\tau_0(t)$ (i.e., a single scaler parameter) are essentially constant if r(t) is assumed to be confined to a suitably small region. This allows the estimation of $w_1$ and $\tau_0$ within the region using standard filtering or estimation techniques if substantially simultaneous measurements of $\tau(t)$ and r(t) are available and the receiver is in motion.

These multipath parameter estimates can subsequently be used to track r(t) using indirect path measurements when other measurements of r(t) are unavailable (for example, when the direct path is lost). Since r(t), $w_1(t)$ and $\tau_0(t)$ are random variables and measurement of $\tau(t)$ is subject to error, a nonlinear filter may be used to accurately track tag location r(t).

Alternatively, assuming that the reflecting plane and the receiver r are fixed, the indirect path length at time t satisfies:

$$\tau(t)w_1(t) = r + E_1 s(t) - 2u_1 c_1 \equiv E_1 s(t) + \rho_1$$

wherein $\rho_1$ is constant. Thus:

$$\tau(t) = w_1^T(t)[E_1 s(t) + \rho_1] \equiv w_1^T(t) E_1 s(t) + \tau_1(t) \quad (1)^*$$

While this analysis is presented for a single multipath bounce, the results are applicable independent of the number of multipath reflections that take place, although the four multipath parameters have a different analytical form. For example, FIG. 2C presents the generalized three-dimensional multipath geometry for two specular reflections. The geometry is similar to that illustrated in FIG. 2B, with the inclusion of a second reflecting surface defined by a unit vector $u_2$ and a scalar value $c_2$. The following equation describes the relationship between indirect path length $\tau = d_0 + d_1 + d_2$ and tag location vector r:

$$\tau w_2 = r - E_2 E_1 s + 2E_2 c_1 u_1 - 2c_2 u_2$$

wherein $$E_2 = 2u_2 u_2^T - I.$$

and $E_2$ represents the transformation (or reflection) matrix associated with the second reflection plane $c_2$.

Assuming that both reflecting planes and the signal source are fixed, the indirect path length at time t can be described as:

$$\tau(t) w_2(t) = r(t) - E_2 E_1 s + 2E_2 u_1 c_1 - 2u_2 c_2 \equiv r(t) + \rho_{02}$$

wherein $\rho_{02}$ is constant. Thus:

$$\tau(t) = w_2^T(t)[r(t) + \rho_{02}] \equiv w_2^T(t) r(t) + \tau_{02}(t) \quad (2)$$

which is of the same form as the one reflection case (i.e., Equation (1)).

Equations (1), (1)* and (2) are in the form of a measurement equation that can be used by an appropriate filter (e.g., an extended Kalman filter, a nonlinear filter, a particle filter) to simultaneously estimate the receiver position r and the four multipath parameters $\{w_2, \tau_{02}\}$.

As discussed in Appendix A, the single-reflection and double-reflection cases may be generalized to formulate an expression for indirect path length as a function of receiver location and four parameters for any number of specular reflections. For n reflections, the four parameters are $\{w_n, \tau_{0n}\}$, where $w_n$ is the unit vector in the direction of the path from the last reflecting surface and $\tau_{0n}$ is the scalar geometry-dependent offset. Since $w_n$ can be expressed as a function of two angles, there are only three independent parameters to be estimated.

The mathematical framework as detailed above and in Appendix A is useful for both navigation (or tracking of receiver) and mapping applications. When the locations of the source and the receiver are known or otherwise determinable, the last reflection point (or facet) for each multipath signal may be calculated. Those reflection points (or facets) may then be synthesized to map a structure and/or objects responsible for generating the multipath signals. Secondary (deeper) facets may be determined by bootstrapping from last-reflection facets based on two-reflection and n-reflection models described below.

It has been empirically determined from simulation that the most robust model (i.e., four-parameter or three-parameter) is application-dependent.

C. Multipath Delay Processing

Figure 3:
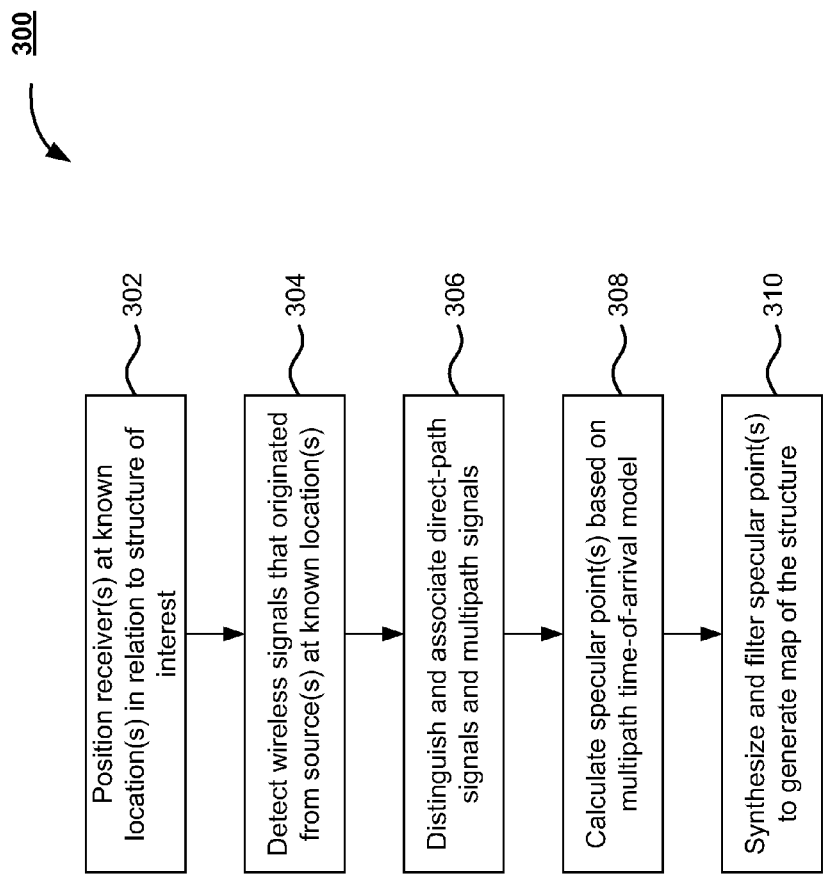
FIG. 3 shows a flow chart illustrating an exemplary method for mapping based on multipath signals in accordance with an embodiment of the present invention.

FIG. 3 is a flow chart of an exemplary processing method 300 for mapping based on a multipath delay model in accordance with an embodiment of the present invention.

In step 302, one or more receivers may be positioned at known or determinable location(s) in relation to a structure or object of interest. The structure or object to be mapped may be a building or a group of buildings (e.g., a building complex). According to one embodiment of the present invention for mapping the interior of a building, a single receiver such as a transponding tag may be placed inside the building sequentially at a number of known locations. Or, the single receiver may be moving along a known trajectory within the building. Alternatively, two or more receivers may be placed at fixed known locations inside and/or outside the building.

In step 304, wireless signals that originated from one or more sources may be detected. The one or more sources may also have known or determinable locations. The one or more sources may be either fixed or moving. According to one embodiment, the sources may include RF transceivers carried by manned or unmanned aerial vehicles or satellites. Alternatively, the sources may be wireless signal transmitters at fixed locations near the building to be mapped. Preferably, each signal source transmits wireless signals that can be reliably associated with that source or distinguished from other sources. Therefore, it may be desirable to encode wireless signals from different sources with distinguishable data, patterns and/or waveform shapes.

The wireless signals detected in step 304 may include both direct-path and multipath signals that are mixed together. In step 306, the detected signals may be processed and/or filtered to distinguish and associate the direct-path and multipath signals. That is, for it to be useful, each multipath component of the detected signal should be isolated or identified and then matched up with its corresponding direct-path signal. Part of the goal is to determine indirect path lengths (or multipath delays) from which geometric information of the building can be derived.

In step 308, specular points responsible for producing the multipath signals may be calculated based on a multipath delay model. The multipath delay model may be developed on the assumption that multipath signals result from ideal specular reflections only, as shown herein and in Appendix A. The location of a specular point (e.g., last reflection) is just one set of variables in the multipath delay model to be solved. When the other variables, such as source location and receiver location, are known or estimated, the specular point may be solved for each individual instance of multipath signals.

In step 310, the specular points calculated in step 308 may be synthesized and filtered to generate a map of the structure of interest. According to some embodiments, the specular points calculated or estimated with the multipath delay model may contain false positives (i.e., extraneous map points) due to imperfection or inaccuracies in signal processing and/or mathematical assumptions. A statistical inference method may be used to distinguish true facets (typically associated with single-reflection paths) from false reflection points (typically associated with multiple-reflection paths). It has been discovered that estimated points associated with a single reflection tend to cluster along the true RF reflection surfaces (facets), while estimated points associated with multiple reflections tend to map into large, poorly defined, clusters. This phenomenon allows the single-reflection paths and true reflection points to be discriminated from the multiple-reflection paths and false reflection points.

In some of the above-described steps, certain known information about the structure may be used to enhance the signal processing and map generation. For example, a partial map of the building of interest may be available and can be useful for enhancing or correcting the mapping results. It may also be hypothesized that most of the building walls are substantially vertical and the floors/ceilings are essentially horizontal. If it is known that a portion of the building has changed recently (e.g., due to fire or explosion), less of a weight may be placed on a prior map or floor plan of that portion.

D. Multipath Mapping Algorithm Development

For a transponding tag roving in a cluttered environment, the signal received at a node after reception and retransmission from the tag may be modeled as:

$$y(t) = \sum_{i=0}^{m} a_i(t) z(t - 2\tau_i(t) - \tau_d) + n(t),$$

wherein $z(t)$ is the transmitted signal, subscript i refers to the $i^{th}$ path (i=0 is the direct path, and i>0 is an indirect path), $\alpha_i(t)$ is the complex attenuation factor, $\tau_i(t)$ is the path delay, $n(t)$ is noise, m is the number of indirect paths, and $\tau_d$ is the processing delay within the tag, which is assumed to be known. The direct path delay is $\tau_0(t)=\|r(t)-s\|/c$, where $r(t)$ is the tag location, s is the node location and c is the signal propagation speed. In the following, the tag state vector at time t will be denoted by $x_t$. At a minimum, $x_t$ contains the tag position $r_t$. Tag position will be expressed in the following as $r_t=H_r x_t$. The tag dynamics may be modeled using a linear discrete-time equation:

$$x_t = \Phi_{t,t-1} x_{t-1} + B_{t,t-1} b_{t-1} + \Gamma_{t,t-1} q_{t-1}$$

wherein $\Phi_{t,t-1}$ is the state transition matrix, $B_{t,t-1}$ is the control influence matrix, $b_t$ is a known control, $\Gamma_{t,t-1}$ is the noise influence matrix, and $q_t$ is zero-mean discrete white Gaussian process noise with covariance matrix $Q_t$, and is independent of $x_t$ and $w_t$. In the following, it is assumed that $\Phi_{t,t-1}$, $B_{t,t-1}$, and $\Gamma_{t,t-1}$ are known, and the initial state $x_0$ is Gaussian with mean $\hat{x}_0$ and covariance matrix $P_0$, thus a Gauss-Markov process.

Time delays $\tau_i(t)$ have been converted into distances using a known signal propagation velocity and a single indirect path is considered. The indirect path distance after a sequence of m specular reflections off planar surfaces is derived as follows. Referring to FIG. 2A (the m-reflection geometry), the relevant equations are, for i=1, 2, . . . , m $$p_i = s + \sum_{j=1}^{i} d_j w_j$$

$$u_i^T p_i = b_i$$

$$w_i = E_i w_{i+1},\ E_i = I - 2u_i u_i^T,\ E_i = E_i^{-1};$$

$$u_i^T w_i = -\cos\theta_i$$

$$r = p_m + d_{m+1} w_{m+1}$$

$$d = \sum_{j=1}^{m+1} d_j$$

wherein $p_i$ is the specular point on the $i^{th}$ plane, $d_1$ is the distance from the source to $p_1$, $\{d_i;\ i=2, 3 \ldots, m\}$ is the distance from $p_{i-1}$ to $p_i$, $d_{m+1}$ is the distance from $p_m$ to r, $w_i$ is the unit vector along the incident ray, $b_i$ is the distance of the plane to the origin of the reference frame, $u_i$ is the unit vector normal to the plane, and d is indirect path length. These may be solved for the indirect path length:

$$d = w_{m+1}^T r - w_1^T s - 2 \sum_{j=1}^{m} b_j \cos\theta_j,$$

which can be written in the form $$d = w_{m+1}^T r + c_m \qquad (3)$$

wherein $$c_m = -w_1^T s - 2 \sum_{i=1}^{m} b_i \cos\theta_i$$

is a scalar offset distance that contains contributions from all m reflections. In Equation (3), $w_{m+1}$ is the unit vector from the last specular point to the tag and contains potentially useful information regarding the geometry of the indoor space.

The multipath parameters $\{w_{m+1}, c_m\}$ vary as the tag moves through the indoor space (e.g., from Point A to Point B). If the variations are too large, the parameters may be essentially unobservable, resulting in poor performance. Generally, the variations decrease as the node moves away from the tag and are relatively small for representative indoor geometries.

The indirect path parameter set $\{w_{m+1}, c_m\}$ contains three unknown parameters in three-dimensional (3D) space and two unknown parameters in two-dimensional (2D) space. Importantly, the form of Equation (3) is independent of the number of reflections, although the offset distance is significantly different. Hence, it does not matter that the number of reflections is unknown in practice, and the accuracy of estimating $\{w_{m+1}, c_m\}$ is not affected by the number of reflections. For this reason, the reflection subscript m is dropped in the following description.

A scalar path length measurement at time t may be denoted with $y_t$ and the measurement history may be denoted with $y^t = \{y_1, y_2, \ldots, y_t\} = \{y^{t-1}, y_t\}$. The scalar measurement $y_t$ may be a direct path measurement, a measurement from an indirect path in the current library, a measurement from a new indirect path, or an erroneous measurement (not from any path). The path identity is unknown. A direct path measurement from a source at location $r^{(s)}$ to a tag at location $r_t$ may be modeled by $y_t = \|r_t - r^{(s)}\| + n_t$, where $n_t$ is measurement noise, which will be modeled throughout as zero-mean Gaussian white noise with rms value $\sigma_n$. In two horizontal dimensions the multipath parameter vector is $$\alpha = \begin{bmatrix} \psi \\ c \end{bmatrix}, w = \begin{bmatrix} \cos\psi \\ \sin\psi \end{bmatrix},$$

wherein $\psi$ is an angle-of-arrival (azimuth), while in three dimensions $$\alpha = \begin{bmatrix} \psi \\ \theta \\ c \end{bmatrix}, w = \begin{bmatrix} \cos\psi\cos\theta \\ \sin\psi\cos\theta \\ \sin\theta \end{bmatrix},$$

wherein $\theta$=angle-of-arrival (elevation). In the following, a measurement from the $i^{th}$ indirect path from the $s^{th}$ source at time t is expressed as $$y_t = w_t^{(si)T} H_t x_t + c_t^{(si)} + n_t.$$

Thus, the objective is to simultaneously estimate tag position $r_t$ and the multipath parameter vector $\alpha$ for each detected indirect path. The indirect path measurements for this problem are non-linear. However, the bilinear form does allow a simplification in the estimation problem: the indirect path measurement $y_t$ conditioned on $\alpha_t^{(si)}$ is linear in tag state vector $x_t$. Conditioning over a sufficiently rich set of hypothesized multipath parameters allows the bilinear estimation problem to be solved using a set of optimal linear estimators (e.g., Kalman filters).

E. Process Flow Illustration

Figure 4:
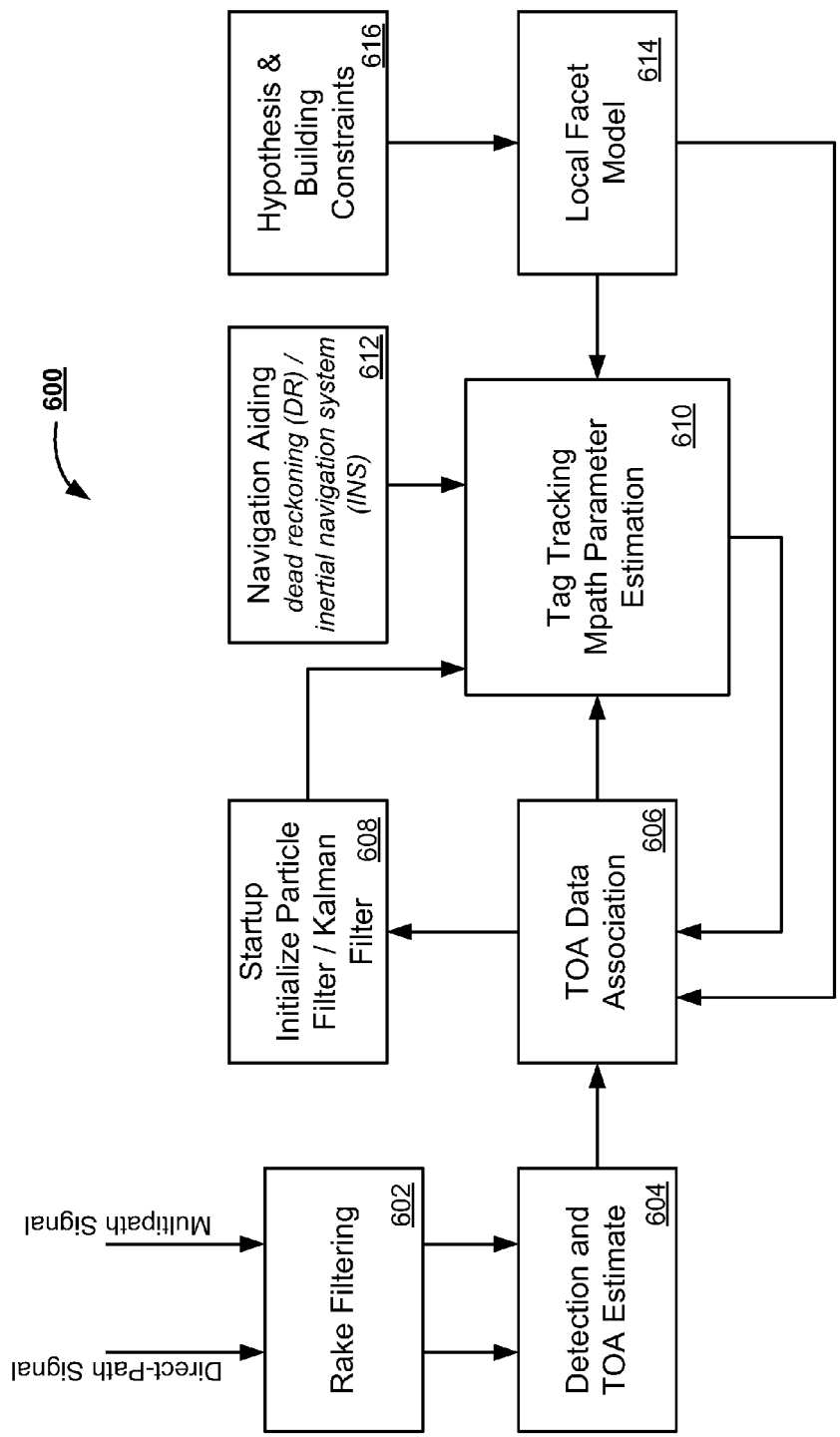
FIG. 4 shows a process flow diagram illustrating an exemplary method for mapping using multipath signals in accordance with an embodiment of the present invention.

FIG. 4 shows a process flow diagram illustrating an exemplary method 600 for mapping using multipath signals in accordance with an embodiment of the present invention. This exemplary mapping method 600 may involve one or more signal sources transmitting wireless signals and at least one transponding tag roving in an area of interest (e.g., inside a building). Inputs to the exemplary process illustrated may include real-time locations of transmitting node(s) (signal source(s)) and receiving node(s). The location of these nodes may be established by deliberately placing them in known locations, by measuring their locations through an RF TDOA process, or by using other sensor systems such as an inertial measurement unit.

Direct and indirect RF signal paths can be separated using algorithms such as MUSIC or by a hardware means such as a Rake filter (Step 602), which may be implemented as a front-end pre-processing unit. MUSIC is a known algorithm that detects frequencies in a received signal by performing an eigen decomposition on the covariance matrix of a data vector of multiple samples obtained from that received signal. A Rake filter is a device that can isolate, from a received signal, individual signal components which are delayed versions of an original signal. Once the direct-path signals and multipath signals have been isolated, the individual signal components may be detected and an estimate the time of arrival (TOA) may be generated for each of them (Step 604). The accuracy of the TOA will be dependent upon the system bandwidth and the TOA processing model (e.g., single-pulse, overlapping pulses, etc.) selected. Additionally since the angle of arrival will be calculated, receiver directivity and source directivity will be factors in establishing the accuracy of the mapping process.

The TOA data may then undergo a data association process (Step 606) such that a multipath signal may be associated with a corresponding direct-path signal. According to some embodiments, data association may be developed using polynomial projection. In one embodiment, this correlation may have already been completed with the Rake filter in Step 602. In other embodiments, the association may be based on the identification of a direct-path signal and associating it with multipath signals detected within a limited time window following the TOA of that direct-path signal.

As mentioned above in connection with Equations (1), (1)* and (2), an appropriate filter (e.g., an extended Kalman filter, a nonlinear filter, or a particle filter) may be applied to the TOA data to simultaneously estimate the receiver (tag) position and multipath parameters, which may take place here in Step 610. The type of filter most suited to a particular application depends on the details of the application. If the error in the initial tag position is relatively small, then an extended Kalman filter alone may suffice. However, initially, tag location errors may be outside the linear range of an extended Kalman filter as the multipath parameters are unknown. Accordingly, the roving receiver or tag location may be initialized using a particle filter (Step 608) to bring the location errors to within the linear range of an extended Kalman filter that recursively performs simultaneous location and multipath parameter estimation in Step 610. Path persistence may be desirable in order to obtain stable multipath parameter estimates, and source directivity can be used to enhance the data association process as reduced beamwidth reduces the number of possible indirect paths.

The indirect path parameters are three unknown parameters in three-dimensional (3D) space and two unknown parameters in two-dimensional (2D) space, independent of the number of reflections. It does not matter that the number of reflections is unknown in practice, as the accuracy of estimating location is unaffected by the number of reflections. In one embodiment, the mapping function is performed by utilizing single bounce data only. An important issue then is to discriminate single bounce multipath from multiple bounce multipath in order to perform the mapping function. Simulation of the mapping function has shown that single bounces tend to proceed along surfaces as expected, whereas multiple bounce effects fall elsewhere, often where there are no surfaces, and tend to cluster, providing a means for discrimination. In addition, reflections that take place when the distance between the transmitter and receiver is small exceed the linearity assumptions in the multipath algorithm and can result in proximity distortions that are rejected. Based on these observations, a local facet model may be employed, in Step 614, to distinguish single-reflection specular points, which tend to be true facets, from those multiple-reflection specular points, which tend to be false facets. The local facet model may also filter out false specular points arising from the proximity distortions.

The local facet model may further enhance accuracy and robustness, speed convergence in estimating multipath parameters, and provide mapping information. Facets are regarded as fixed in space, and provide an attractive set of invariants. Building constraints or a priori information, such as preferred orientations and partial maps, can be employed to enhance performance of the local facet model (Step 616). Non-real-time estimation (smoothing) techniques may be used to iteratively improve facet estimates. The use of stored data and backward smoothing techniques may further correct for the effects of past data association errors. Thus, the TOA data association can be further improved with feedback from the tracker and multipath parameter estimation (Step 610) as well as the local facet model (Step 614). In an embodiment where the trajectory of the tag is not known or predetermined, one or more navigation aiding mechanisms may be employed (Step 612) to assist in tracking the tag's location and in multipath parameter estimation, particularly when a direct path is unavailable. Exemplary navigation aiding mechanisms include dead reckoning methods and inertial navigation systems.

F. Multipath Parameter Estimation

An exemplary use of an extended Kalman filter is described below in connection with a statistical model. The statistical model may consist of a state vector, a statistical propagation model, and a statistical measurement model. If the state vector is x(t), then the statistical model may be, for example:

$$x(t) = \begin{bmatrix} r(t) \\ v(t) \end{bmatrix} \quad (4)$$

where v(t) is tag velocity.

Assuming the state vector definition of Equation (4), a possible statistical model for propagating the state vector from time $t_i$ is to time $t_{i+1}$ is:

$$x(t_{i+1}) = \Phi(i+1, i)x(t_i) + u(t_i) + q(t_i)$$

$$\Phi(t_{i+1}, t_i) = \begin{bmatrix} I & I(t_{i+1} - t_i) \\ 0 & I \end{bmatrix}$$

where $\Phi(t_{i+1}, t_i)$ is the state transition matrix, $u(t_i)$ is a known control input, I is the identity matrix, and $q(t_i)$ is a zero-mean white driving noise used to model uncertainties in the knowledge of the true propagation model. This model is generally applicable for small time steps $t_{i+1}-t_i$ and relatively constant tag velocities.

Within the filter, the estimated state is propagated using:

$$\hat{x}(t_{i+1}) = \Phi(t_{i+1}, t_i)\hat{x}(t_i) + u(t_i) \quad (5)$$

The filter also carries an estimate of the error covariance matrix $P(t_i)=E\{e(t_i)e(t_i)^T\}$, where $e(t_i)=\hat{x}(t_i)-x(t_i)$, and superscript T denotes matrix transpose. The error covariance matrix is propagated in the filter using:

$$P'(t_{i+1})=\Phi(t_{i+1},t_i)P(t_{i+1})\Phi^T(t_{i+1},t_i)+Q(t_i) \quad (6)$$

where $Q(t_i)=E\{q(t_i)q(t_i)^T\}$, and where $E\{\bullet\}$ denotes mathematical expectation of the quantity within the brackets.

Under the assumed model, two distinct measurements are available: direct path delay measurements and indirect path delay measurements. A direct path delay measurement from a transmitting node to the tag at time $t_i$ is modeled as:

$$d_{meas}(t_i)=\|r(t_i)-s\|+n_d(t_i) \quad (7)$$

wherein s is the known location of the transmitting node, $\|z\|$ denotes the length of the vector z, and the measurement noise $n_d(t_i)$ is modeled as a zero-mean white noise with variance $\sigma_d^2(t_i)=E\{n_d^2(t_i)\}$. An indirect path delay measurement from a transmitting node to the tag may be modeled as:

$$\tau_{meas}(t_i)=w^T(t_i)r(t_i)+\tau_0(t_i)+n(t_i) \quad (8)$$

wherein $n(t_i)$ is zero-mean white noise with variance $\sigma_n^2(t_i)$. As noted previously, this model for an indirect path measurement is applicable for any number of specular reflections.

Successful navigation in multipath environments might require accurate estimates of the multipath parameters and the state vector simultaneously in real time. For mapping purposes, the tag may be configured to collect or re-transmit the detected data first, and the processing of the data may be delayed or postponed and performed in batch. The above-described extended Kalman filter formulation allows these goals to be realized by using well-known tools of nonlinear filtering theory. In particular, the bilinear form of the indirect path measurements lends itself to particularly simple recursive nonlinear filter mechanizations.

Consider the process of updating the state vector estimate and error covariance matrix estimate using a direct path measurement. This is a straightforward application of standard nonlinear filtering methods, including extended Kalman filtering and particle filtering. For simplicity, the following discussion assumes the use of an extended Kalman filter.

The direct path measurement is given by Equation (7). Accordingly, the filter's estimate of this measurement is:

$$d'_{means}(t_i)=\|r'(t_i)-s\| \quad (9)$$

where a prime ( )' is used throughout to denote association with the value of a variable just prior to measurement updating. A standard extended Kalman filter is then used to update the state vector estimate and the error covariance matrix estimate using the following equations:

$$\hat{x}(t_i)=x'(t_i)+K_d(t_i)v_d(t_i) \quad (10)$$

$$P(t_i)=P'(t_i)-K_d(t_i)H'_d(t_i)P'(t_i) \quad (11)$$

wherein $v_d(t_i)=d_{meas}(t_i)-d'_{meas}(t_i)$ is the measurement residual, and the measurement matrix $H'_d(t_i)$ is:

$$H'_d(t_i) = \frac{\partial d'_{meas}(t_i)}{\partial x'(t_i)} = [(r'(t_i)-s)^T / d'_{meas}(t_i) 0] \quad (12)$$

and $K_d(t_i)$ is the extended Kalman filter gain given by:

$$K_d(t_i)=P'(t_i)H'_d{}^T(t_i)/(H'_d(t_i)P'(t_i)H'_d{}^T(t_i)+\sigma_d^2(t_i)) \quad (13)$$

Consider next updating the state vector estimate and error covariance matrix estimate using an indirect path measurement. The indirect path measurement is given by Equation (8). From this, the filter's estimate of the measurement is:

$$\tau'_{meas}(t_i)=w'^T(t_i)r'(t_i)+\sigma'_0(t_i) \quad (14)$$

Using Equations (8) and (14), the measurement may be written as:

$$\tau_{meas}(t_i)=\tau'_{meas}(t_i)-r'^T(t_i)e'_w(t_i)-w'^T(t_i)e'_r(t_i)+e'_w{}^T(t_i)e'_r(t_i)-e'_{\tau 0}(t_i)+n(t_i) \quad (15)$$

wherein $e'_r(t_i)=r'(t_i)-r(t_i)$ is the error in the a priori estimate of tag position r(t), $e'_w(t_i)=w'(t_i)-w(t_i)$ is the error in the a priori estimate of the unit vector w(t), and $e'_{\tau 0}(t_i)=\tau'_0(t_i)-\tau_0(t_i)$ is the error in the a priori estimate of the offset parameter $\tau_0(t_i)$.

Assuming that the errors are sufficiently small that the second-order error term in Equation (15) may be neglected, the result is then:

$$\tau_{meas}(t_i)=\tau'_{meas}(t_i)-r'^T(t_i)e'_w(t_i)-w'^T(t_i)e'_r(t_i)-e'_{\tau 0}(t_i)+n(t_i) \quad (16)$$

for the indirect path delay measurement. Therefore, the measurement residual is:

$$v_x(t_i)=\tau_{meas}(t_i)-\tau'_{meas}(t_i)=-r'^T(t_i)e'_w(t_i)-w'^T(t_i)e'_r(t_i)-e'_{\tau 0}(t_i)+n(t_i) \quad (17)$$

The state vector may be updated using an indirect path measurement in several different ways. The following example assumes that the state vector estimate and the multipath parameter estimates are updated sequentially in two separate steps. In both steps, it is assumed that an extended Kalman filter is used.

The calculations are shown for processing a single multipath delay measurement from a single transmitting node; multiple indirect path delay measurements from multiple nodes at the same time may be processed sequentially using the identical extended Kalman filter equation forms.

For updating the state vector estimate using an indirect path measurement, the measurement residual $v_x(t_i)$ is written in the form:

$$v'_x(t_i)=-H'_x(t_i)e'_x(t_i)+n'_x(t_i) \quad (18)$$

where $H'_x(t_i)=[w'^T(t_i)0]$, $e'_x(t_i)=x'(t_i)-x(t_i)$, and the measurement noise:

$$n'_x(t_i)=-r'^T(t_i)e'_w(t_i)-e'_{\tau 0}(t_i)+n(t_i) \quad (19)$$

is modeled in the filter as zero-mean white noise with variance:

$$\sigma'^2_{nx}(t_i)=r'^T(t_i)P'_w(t_i)r'(t_i)+\sigma'^2_{\tau 0}(t_i)+\sigma_n^2(t_i) \quad (20)$$

where $P'_w(t_i)=E\{e'_w(t_i)e'^T_w(t_i)\}$ is the error covariance matrix for the estimate $w'(t_i)$ and $\sigma'^2_{\tau 0}(t_i)$ is the error variance for the estimate $\tau'_0(t_i)$. With this assumption, the variance of the measurement residual is:

$$\sigma'^2_{vx}(t_i)=H'_x(t_i)P'(t_i)H'^T_x(t_i)+\sigma'^2_{nx}(t_i) \quad (21)$$

The updated estimates of the state vector and the error covariance matrix are calculated using the standard extended Kalman filter equations:

$$\hat{x}(t_i)=\hat{x}'(t_i)+K_x(t_i)v_x(t_i) \quad (22)$$

$$P(t_i)=P'(t_i)-K_x(t_i)H'_x(t_i)P'(t_i) \quad (23)$$

wherein $K_x(t_i)$ is the extended Kalman filter gain:

$$K_x(t_i)=P'(t_i)H'^T_x(t_i)/\sigma'^2_{vx}(t_i) \quad (24)$$

For updating the multipath parameter estimates, the parameter vector is defined as:

$$\alpha(t_i) = \begin{bmatrix} w(t_i) \\ \tau_0(t_i) \end{bmatrix} \quad (25)$$

The measurement residual given in Equation (17) is now written as:

$$v'_\alpha(t_i)=-H_\alpha(t_i)e'_\alpha(t_i)+n'_\alpha(t_i) \quad (26)$$

wherein $H_\alpha(t_i)=[r'^T(t_i)1]$, $e'_\alpha(t_i)=\alpha'(t_i)-\alpha(t_i)$, and the measurement noise:

$$n'_\alpha(t_i)=-w'^T(t_i)e'_r(t_i)+n(t_i) \quad (27)$$

is modeled in the filter as zero-mean white noise with variance:

$$\sigma'^2_{n\alpha}(t_i)=w'^T(t_i)P'_r(t_i)w'(t_i)+\sigma_n^2(t_i) \quad (28)$$

wherein $P'_r(t_i)=E\{e'_r(t_i)e'^T_r(t_i)\}$ is the error covariance matrix for the tag position estimate $r'(t_i)$.

Under these assumptions, the variance of the measurement residual is:

$$\sigma'^2_{v\alpha}(t_i)=H'_\alpha(t_i)P'_\alpha(t_i)H'^T_\alpha(t_i)+\sigma'^2_{n\alpha}(t_i) \quad (29)$$

wherein $P'_\alpha(t_i)=E\{e'_\alpha(t_i)e'^T_\alpha(t_i)\}$ is the covariance matrix of the a priori parameter vector estimation $e'_\alpha(t_i)=\alpha'(t_i)-\alpha(t_i)$. The updated estimates of the multipath parameter vector and the error covariance matrix are calculated using the standard extended Kalman filter equations:

$$\hat{\alpha}(t_i)=\alpha'(t_i)+K_\alpha(t_i)v(t_i) \quad (30)$$

$$P_\alpha(t_i)=P'_\alpha(t_i)-K_\alpha(t_i)H'_\alpha(t_i)P'_\alpha(t_i) \quad (31)$$

wherein $K_x(t_i)$ is the extended Kalman filter gain:

$$K_\alpha(t_i)=P'_\alpha(t_i)H'^T_\alpha(t_i)/\sigma'^2_{v\alpha}(t_i) \quad (32)$$

G. Illustrative Indoor Mapping Performance

Figure 5A:
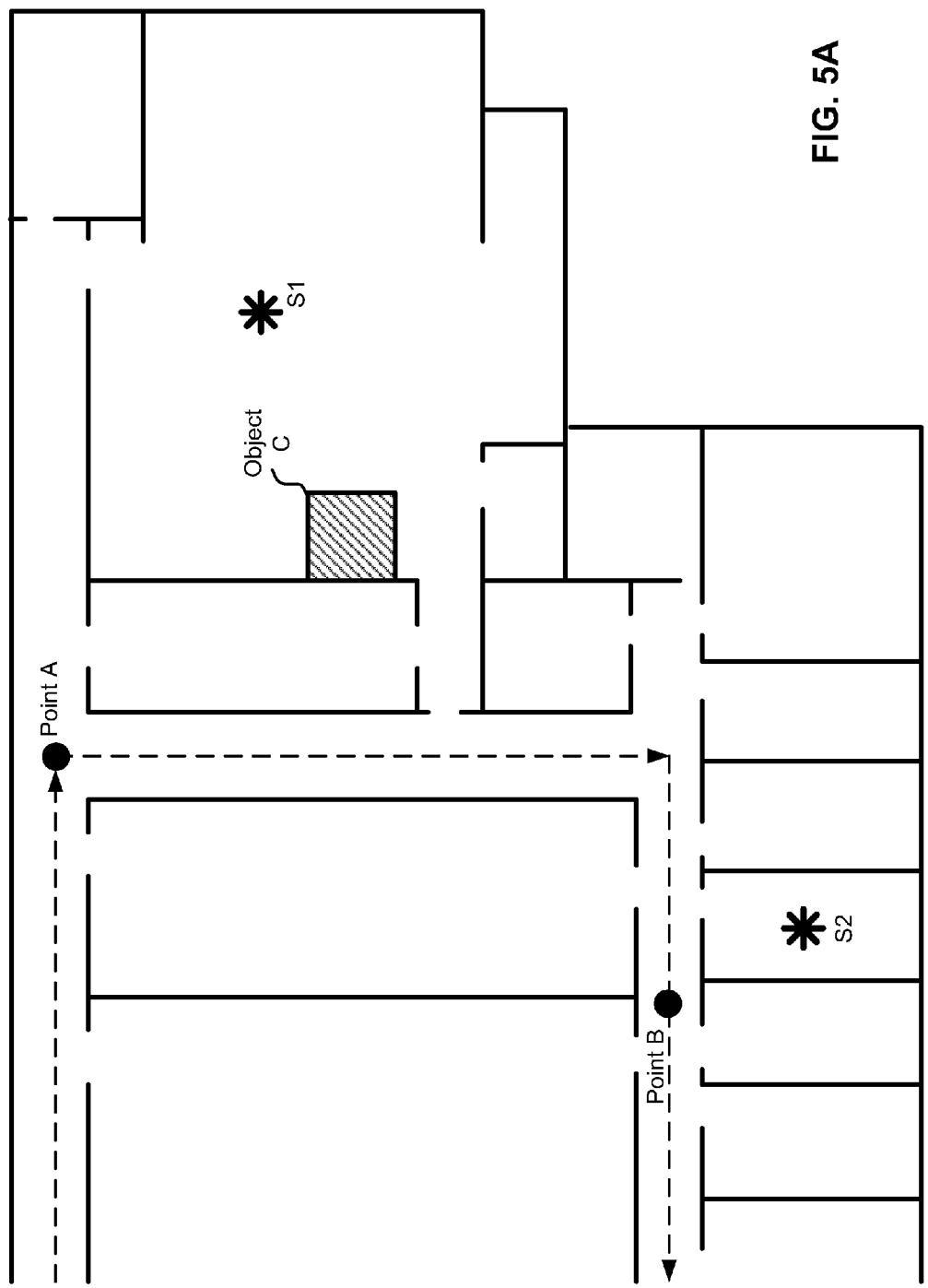
Figure 5B:
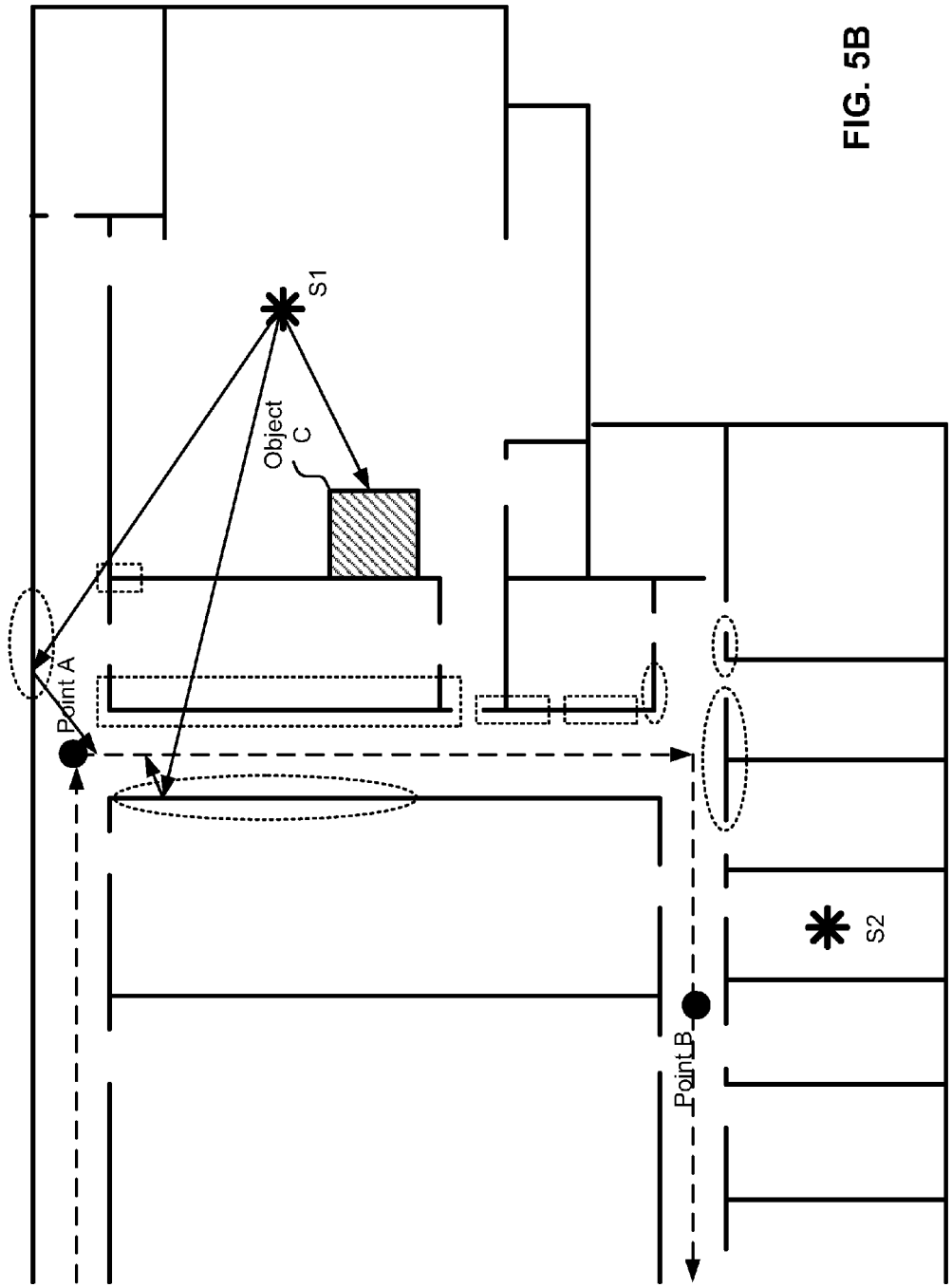

These analytic derivations were employed to demonstrate the multipath mapping process employing the model of a real building structure to include the RF transmittive and attenuative characteristics of its structural materials. FIGS. 5A-C show a floor plan of a building to illustrate one exemplary method for mapping using multipath signals in accordance with an embodiment of the present invention. The floor plan represents an experimental setting in which the multipath mapping method was tested. In this experimental setting, most of the walls may either reflect wireless signals or allow the wireless signals to pass through with some attenuating effect, except that an object C is completely opaque to the wireless signals.

Referring to FIG. 5A, there are shown two signal transmitters S1 and S2 that are placed in two rooms some distance apart. The dashed lines and arrows indicate a trajectory for a transponding tag (not shown). The tag may have the capabilities of receiving wireless signals that originate from S1 and S2, pre-processing the signals, and optionally re-transmitting the processed or pre-processed data to another processor for map generation. According to one embodiment, the tag may start detecting signals at Point A and finish detecting at Point B.

FIGS. 5B and 5C show ray trace data based on the floor plan, the tag track A-B, and the locations of transmitters S1, S2 and of Object C. Exemplary rays of wireless signals are shown as solid lines with arrows. In FIG. 5B, portions of walls that can reflect or attenuate wireless signals from the transmitter S1 are marked with dotted oval circles (indicating single reflection surfaces) and dotted rectangular boxes (indicating attenuating layers) respectively. Similarly, in FIG. 5C, portions of walls that can reflect or attenuate wireless signals from the transmitter S2 are marked with dotted oval circles (indicating single reflection surfaces) and dotted rectangular boxes (indicating attenuating layers) respectively. It can be noted that, between FIGS. 5B and 5C, most of the walls along the tag track between Point A and Point B can potentially serve as single-reflection surface for at least one of the transmitters S1 and S2. However, due to the obstruction of the opaque Object C, a portion of the walls between Point A and Point B does not reflect wireless signals from either transmitter. The ray trace data illustrated and described herein may later be used to verify the multipath mapping results achieved with the tag and the signal sources (i.e., transmitters S1 and S2).

FIG. 6 shows a floor plan of a building to illustrate exemplary mapping results using multipath signals in accordance with an embodiment of the present invention. This floor plan is the same as the one shown in FIG. 5A with a similar setting of two transmitting sources (S1 and S2) and a single roving receiver (not shown). The mapping results were obtained based on the methodology illustrated in FIG. 4. For single reflections, the "x" symbols indicate vertical reflection points, and the "O" symbols indicate horizontal reflection points. For clarity, only vertical multiple reflection points are shown (as indicated with "Δ" symbols). With reference to FIGS. 5B and 5C, it may be seen that the wall surfaces are clearly mapped as they coincide with the single-reflection points. Referring again to FIG. 6, the multiple-reflection signals result in artificial reflection locations elsewhere within the building, generally clustered into groupings that are identifiable (e.g., cluster 702). Proximity effects (e.g., false reflection points 704) can be observed in the vicinity of S2 because the tag has moved too close to the source S2.

H. Satellite Based Transparency Mapping Example

Figure 7:
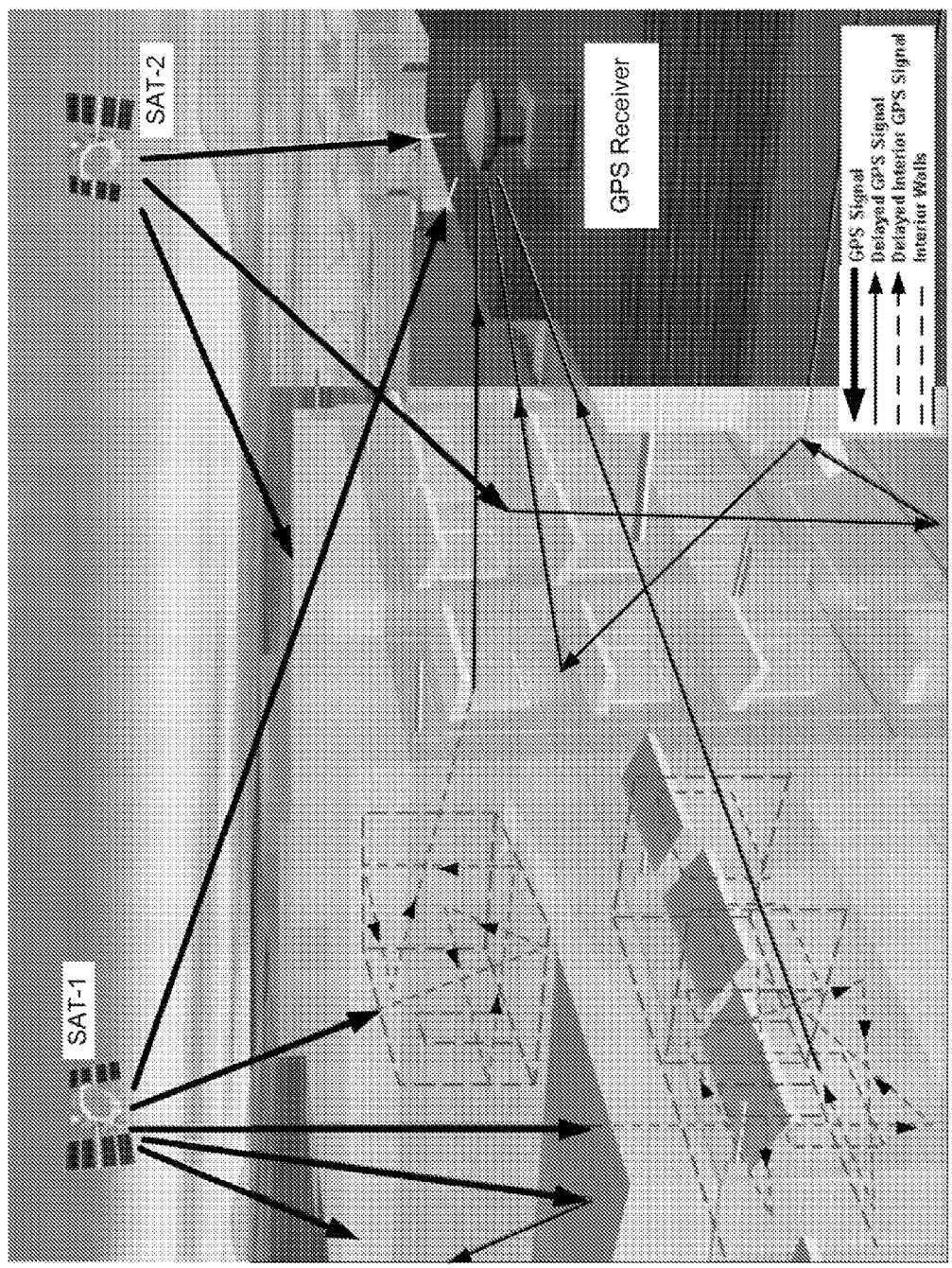
FIG. 7 illustrates a system for mapping using multipath signals in accordance with an embodiment of the present invention.

FIG. 7 shows a layout of an exemplary system for satellite-based urban and indoor mapping using multipath signals in accordance with an embodiment of the present invention. In one embodiment, the satellite-based mapping is implemented with one or more receivers that are augmented with a Rake processor and implanted in fixed locations close to an area of interest. The receivers may be GPS, Iridium, or other type of receivers. For ease of description, it is assumed that a GPS receiver is employed, as shown in FIG. 7, to map the indoor space of a building.

The GPS receiver may be positioned outside the building to be mapped and at an elevated location, or where an unobstructed sight of the building and at least one GPS satellite is available. In the setup shown in FIG. 7, the GPS receiver is located on the roof of another building. Only two GPS satellites, SAT-1 and SAT-2, are shown although more satellites may be beneficial. GPS signals originating from the satellites may be received by the GPS receiver in a number of ways, such as via a direct path, via a single-reflection multipath after bouncing off an exterior surface of the building, or via a more complex multipath after penetrating the building's exterior walls and experiencing one or more reflections inside the building. The GPS receiver may gather both the direct-path signals as well as all those multipath signals having time differences consistent with the area to be mapped. The satellite constellation's motion provides a desirable dynamic scanning of the infrastructure. The direct-path and multipath time differences are then processed to produce 3-D transparency maps of the building. Because both the direct-path and multipath signals, subsequent to structural penetration and reflection, are received by the same receiver, the timing synchronization that typically limits coherence techniques is less important.

While many frequencies, such as L-band, are well suited for structural penetration, these signals are normally considered too weak for detection subsequent to multiple internal reflections and upon exiting a building structure. However, in this case, there are very short time differences between the reception of the direct-path and the multipath signals, which enables the use of special RF coherence techniques (e.g., data wiping, as described below) to enhance such signals to the required levels of detection.

RF signals that enter a building are subject to multiple interior reflections and, upon exiting the building, will be detected by a receiver exterior to that building. For GPS, these signals are normally down approximately 156 dBW to start with and may suffer an additional 40 dB or more attenuation before exiting the building. Given this level of attenuation, this might seem to be a hopeless task. However, coherent processing techniques have demonstrated the reception of indoor GPS signals as much as 60 dB below their reference signal levels outdoors.

In one embodiment, with the above-described multipath mapping concept, a direct-path GPS signal is received exterior to the building infrastructure, and that signal becomes the basis for timing the measurements of the interior reflected signals, both in code and Doppler, and it enables the described mapping algorithms to develop 3-D interior structural images over an extended period of observation. This mapping concept is somewhat similar to tomography in the sense that GPS satellites' motion provides a scanning of the mapped structure. The geometry-based multipath delay model may be used to determine points of reflection directly from the multipath data.

In one embodiment, satellite-based transparency mapping requires statistical analysis of reflection points and the use of context to determine characteristics of objects or surfaces of interest (e.g., location, size, texture, motion, etc.). At any single instant in time, the combination of satellite position, building infrastructure multipath reflection and transmission characteristics, and receiver position can result in a relatively short time interval of RF observation for diverse sections of the infrastructure, akin to a reception of random RF pixels. However, over time, as the satellite constellation "paints" different structural reflection combinations from different aspect angles, these RF pixels will eventually develop into a 3-D transparent image of the surrounding structure.

I. GPS Multipath Signal Extraction & Processing

The transparency mapping system, as illustrated in FIG. 7, allows the development of 3-D transparent images and maps of urban areas of interest. The GPS receiver, which is adapted to receive multipath signals, may be used in determining the relationship between the receiver location and the multipath signals by separately identifying related multipath signals and the direct-path signal (each signal having originated from the same source). Because GPS signal strength detected in the transparency mapping may be extremely low, special techniques may be desirable to recover the signal. RF communication signal strength can often be enhanced by the process of coherent integration. There are typically two different codes embedded in a GPS signal, a PRN code at a high rate (e.g., 1 or 10 MHz) and a data message at a slower rate (e.g., 50 Hz). The degree of coherent integration that can be achieved in a GPS receiver is normally limited by the data message rate to no more than 20 milliseconds as message changes will preclude predictable coherent integration beyond that time interval. Data wiping is a process of coherent integration of the signal that may be used to increase the signal-to-noise ratio (SNR) in GPS receivers. It consists of prior extraction of the data message from the received signal, enabling coherent integration beyond the limits imposed by the data message.

Figure 8:
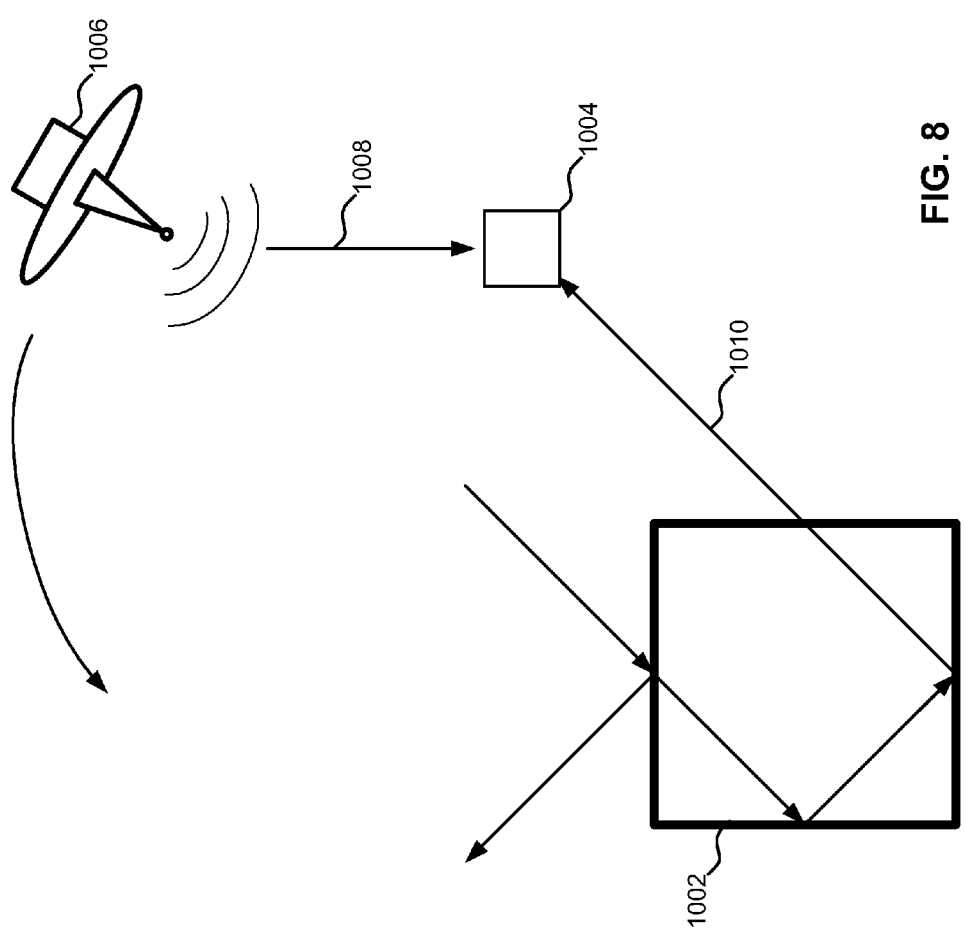
FIG. 8 illustrates the structural geometry for enhancing satellite-based signals through data wiping for transparency mapping in accordance with an embodiment of the present invention.

FIG. 8 illustrates an exemplary data wiping method for satellite-based transparency mapping in accordance with an embodiment of the present invention. According to this embodiment, GPS data wiping is successfully performed by processing both a reference signal (i.e., a clean GPS signal, without multipath, directly from overhead) and those multipath signals emanating from within an urban structure 1002 using a single GPS receiver 1004. By processing both signals within the same unit 1004, the issue of timing instabilities is resolved and GPS signals that are more than −200 dBW down may be recovered. As depicted in FIG. 8, the GPS direct signal 1008 is received at the GPS receiver 1004 from the satellite constellation 1006, and the multipath signal 1010, containing urban structural data, is also received at the same GPS receiver 1004. Two antennas could be employed on the GPS receiver 1004, one looking up and one looking down (at the structure 1002). The satellite constellation 1006 provides a scanning motion. At any single instant in time, the combination of satellite position, building infrastructure multipath reflection and transmission characteristics, and receiver position may result in a relatively short time interval of RF observations for diverse sections of the structure 1002. Over time, as the satellite constellation 1006 "paints" different structural reflection combinations from different aspect angles, these RF pixels will develop into a 3-D transparent image of the structure 1002.

Figure 9:
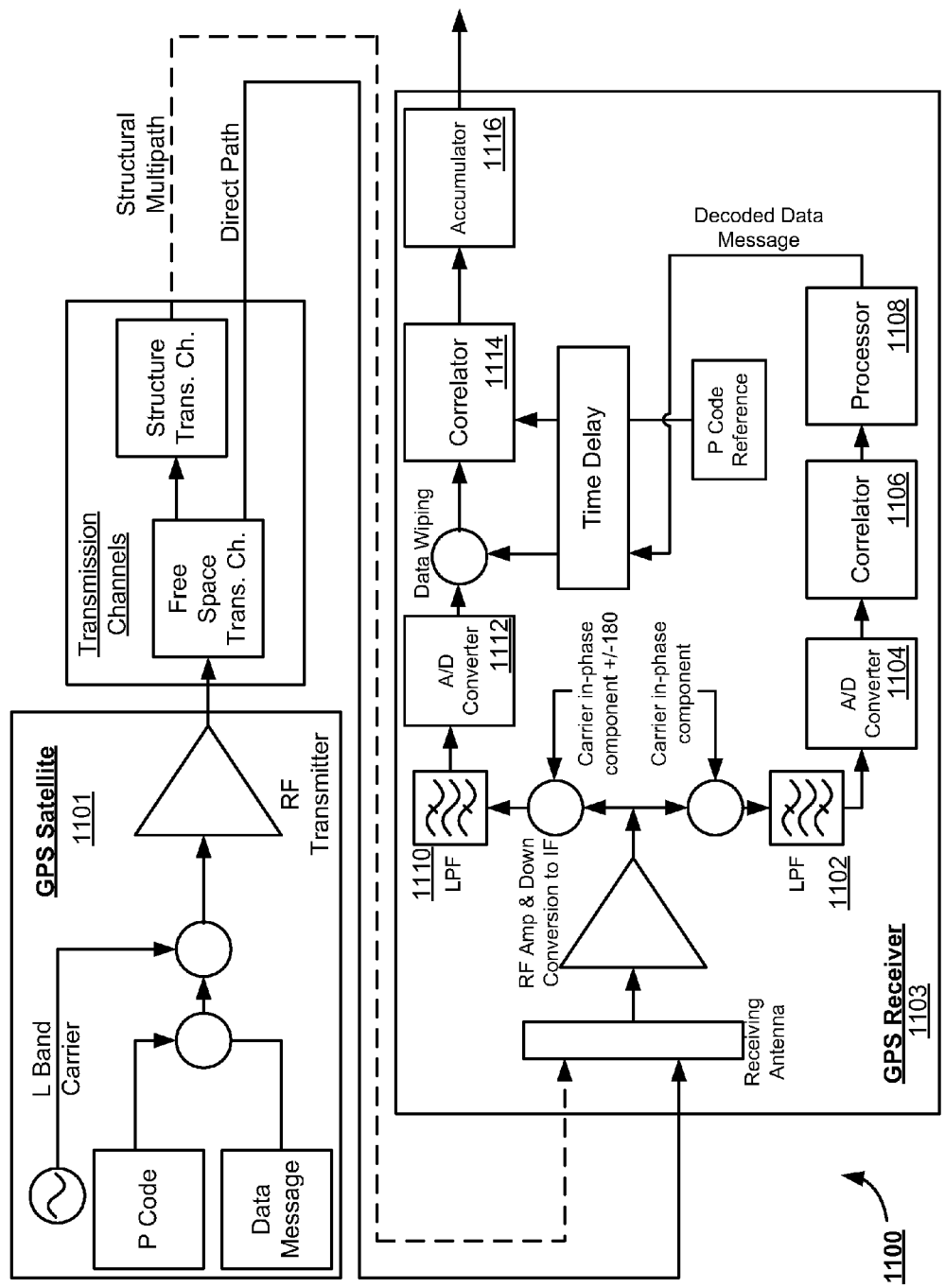
FIG. 9 shows a block diagram illustrating an exemplary system for satellite-based transparency mapping in accordance with a data wiping embodiment of the present invention.

FIG. 9 shows a block diagram illustrating an exemplary system 1100 for satellite-based transparency mapping in accordance with an embodiment of the present invention. For a conceptual illustration, only one GPS satellite 1101 and one GPS receiver 1103 are shown. The GPS satellite 1101 may modulate both a PRN code sequence (e.g., P Code) and a data message onto a L-band carrier wave. The resulting signal is transmitted through an intervening medium including a free space transmission channel and/or a structure transmission channel (i.e., penetration and reflection within a structure). Therefore, the signal may arrive at the GPS receiver 1103 via two principle paths: the direct sky path and the indirect multipath via reflection from the urban infrastructure.

The GPS receiver 1103 may implement a first data path that includes low-pass filter (LPF) 1102, analog-to-digital (A/D) converter 1104, correlator 1106, and processor 1108. Along the first data path, the direct path signals may be processed in a conventional manner that includes decoding of the data message. The indirect multipath signals arrive at the GPS receiver 1103 delayed from the direct path signals. The indirect multipath signals may be processed along a second data path that includes low-pass filter (LPF) 1110, analog-to-digital (A/D) converter 1112, correlator 1114, and accumulator 1116. Prior to a correlation process with a delayed PRN code reference (e.g., P Code), the indirect multipath signals may have their data message removed. The time delay or synchronization required between the direct and indirect signals is achieved by matching the PRN code sequence through an autocorrelator function. Delay between the direct-path and multipath signals may be resolved within a single chip length (a chip is the pulse width of a single pulse in a PRN code sequence), as described in more detail below. The correlator 1114 may then pass the indirect multipath signal to an accumulator 1116 that performs coherent integration necessary to provide RF visibility into an urban structure.

J. Multipath Signal Resolution

Figure 10:
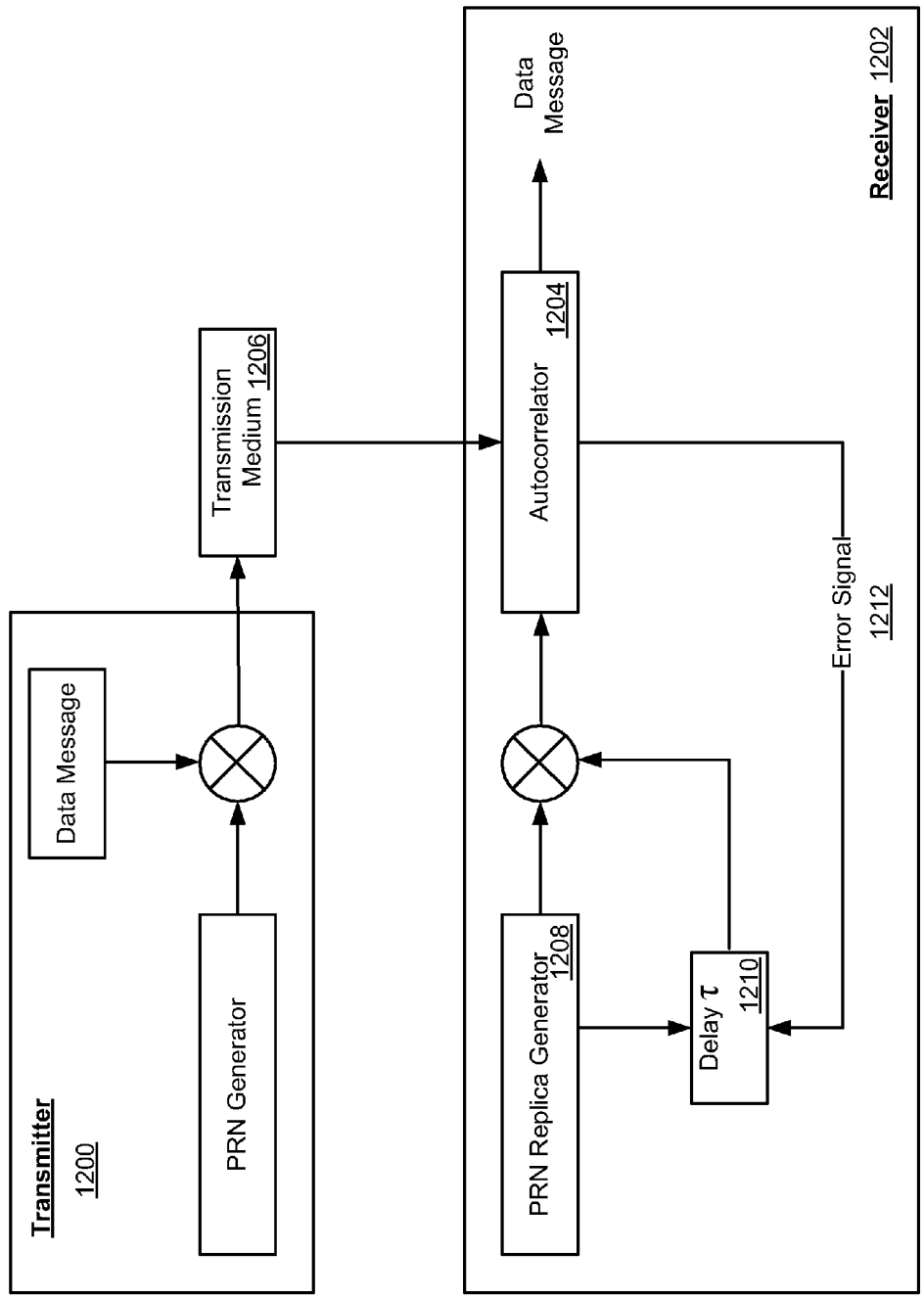
FIG. 10 shows a block diagram illustrating an exemplary multipath signal resolution method for satellite-based transparency mapping in accordance with an embodiment of the present invention.

FIG. 10 shows a block diagram illustrating an exemplary signal resolution autocorrelation method for satellite-based transparency mapping in accordance with an embodiment of the present invention.

Figure 11:
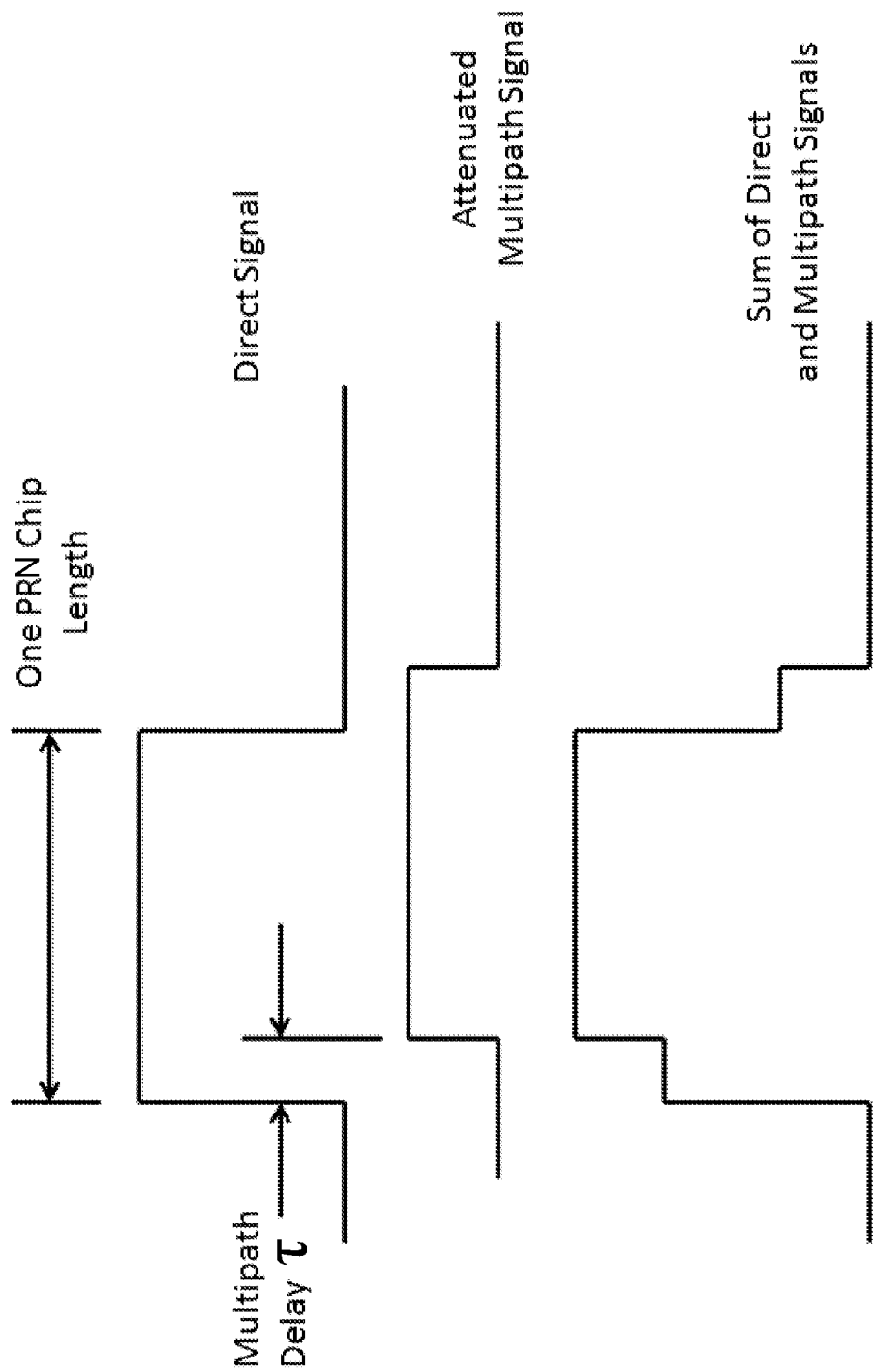
FIG. 11 shows exemplary waveforms for signal resolution, PRN generation, and signal autocorrelation processes in accordance with an embodiment of the present invention.

In operation, a transmitter 1200 generates a PRN code sequence at a higher rate than a data message rate, resulting in a spread spectrum transmission. The received signal is typically correlated in the receiver 1202 with a locally generated replica of the PRN code sequence. When the received PRN code and a local PRN code match, the correlator 1204 response peaks and the message becomes observable. The received signal, after passing through the transmission medium 1206, can, however, become adulterated by the reflections of the transmitted signal (multipath signal) mixing with the received direct signal. The mixing of the direct signal and a reflected signal is depicted in FIG. 11. This illustration is simplified to show only a single reflected signal whereas in reality there may be several multipath signals. FIG. 11 shows the direct signal and a close-by multipath signal that is delayed by an unknown τ seconds. It is assumed that the multipath signal is close to the direct signal as this is the primary issue for CDMA systems, as multipath signals that are beyond one chip length do not correlate with the PRN reference signal and are rejected. The total signal received, which is the sum of the direct-path signal and the multipath signal, no longer has the pulse shape of the transmitted CDMA PRN but has a new shape as shown at the bottom of FIG. 11.

In conventional CDMA systems, this received signal (with the new shape) is correlated with an idealized replica of the transmitted PRN pulse shape, as shown, over a single chip length. As the correlation process does not involve two similarly shaped pulses, the correlation function appearance does not take on the traditionally accepted triangular shape but has a new shape, with a flatter top, making the location of the direct signal difficult. To solve this problem, a receiver according to embodiments of the present invention may synthesize a PRN code reference that has the shape of the received signal. As the delay τ between the direct-path and multipath signal is unknown, this requires scanning of different values of τ until the correlation function peaks. Thus, referring to FIG. 10, an ideal PRN replica is generated in a PRN replica generator 1208. Also, a delayed (and possibly attenuated) version of the same code sequence is generated through a delay element 1210. Then, the two code sequences are added to form a new PRN shape which is correlated to the received signal. If the correlation 1204 response does not peak, an error signal 1212 is sent to the delay element 1210 to further adjust the delay value τ. Through this feedback mechanism, autocorrelation between the received signal and the synthesized PRN may continue until the delay value τ is correct. This τ value represents a physical distance between the direct-path signal and the multipath signal.

As this process adds another degree of freedom (DOF) (i.e., two-DOF Doppler and code detection instead of one-DOF Doppler in a standard GPS receiver) to the process of identifying the correlation peak, there is additional processing time required to come to a correct solution. Such a process may operate well off-line, where time constraints are not an issue, but could add some delay to a real-time solution.

In order to address the situation where there may be several multipath components within the received signal, it may be desirable to synthesize a PRN from several delayed codes, each utilizing a different delay $\tau_1, \tau_2, \ldots \tau_n$. This can increase the degrees of freedom and the computational burden rapidly if there are a number of multipath components with signal strengths comparable to the direct signal.

It will therefore be seen that the foregoing represents a highly advantageous approach to mapping a cluttered environment.

The terms and expressions employed herein are used as terms of description and not of limitation and there is no intention, in the use of such terms and expressions, of excluding any equivalents of the features shown and described or portions thereof, but it is recognized that various modifications are possible within the scope of the invention claimed.

For example, although some of the examples presented refer to transceivers sending signals to a tag, one of ordinary skill in the art will recognize that embodiments of the present invention also encompass a tag that sends signals to transceivers, or any combination of transceivers and tags that simultaneously transmit and receive signals to each other. Moreover, Doppler measurements of the multiphase elements are also useful for observing activity elsewhere in the building complex and represent a useful byproduct of geolocation and mapping activity.

Therefore, it must be expressly understood that the illustrated embodiments have been shown only for the purposes of example and should not be taken as limiting the invention, which is defined by the following claims. The following claims are thus to be read as not only literally including what is set forth by the claims but also to include all equivalents that are insubstantially different, even though not identical in other respects to what is shown and described in the above illustrations.

K. Appendix A

Detailed Development of Multipath Solutions

This appendix presents the basic geometry and multipath solutions appropriate for indoor/urban mapping. The measurement equations required for solving the indoor mapping problem discussed above follow directly from the multipath solutions.

The following discussion considers the geometry associated with indirect paths having an arbitrary number of specular reflections. The one-way distance from the source to a receiver (e.g., a tag or transponder) is used as a measure of path length. The first case considered is one source and one indirect path, which generalizes trivially to any number of sources and indirect paths.

The fundamental measurements available to an indoor mapping system are the direct and indirect path lengths. The path identities (i.e., direct and indirect) are unknown and must be inferred from the measurements. It will be assumed throughout this discussion that: the identity and location of all sources is known; the locations and orientations of all reflecting surfaces are unknown; and the number of reflections associated with all indirect paths is unknown. Under these assumptions, determinininistic expressions are derived for indirect path length for an arbitrary number of reflections. These expressions form the basis of the measurement equations used by the indoor mapping system.

Figure 12:
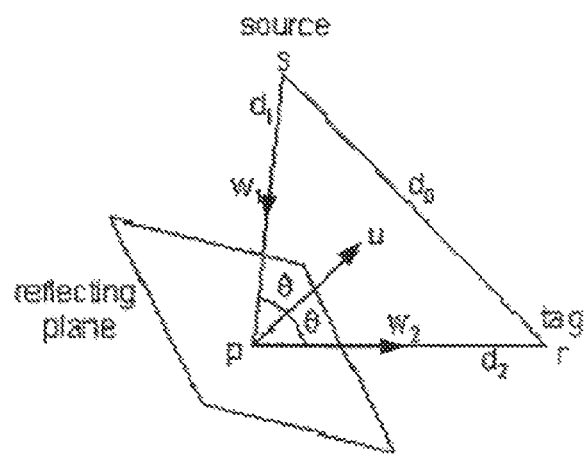
FIG. 12 is another depiction of the geometry associated with a single specular reflection.

The geometry for one specular reflection is shown in FIG. 12. The source is at known location s and the tag is at unknown location r. The direct path length is $d_0 = \|s-r\|$, and the (one way) indirect path length is $d = d_1 + d_2$. The unit vectors $w_1$ and $w_2$ represent the direction of the incident and reflected signal, u is the unit vector normal to the reflecting plane, and P is the specular point.

The equations describing the multipath geometry for one reflection are:

$$p = s + d_1 w_1 \tag{A.1}$$

$$u^T p = b_1 \tag{A.2}$$

$$w_1 = E_1 w_2, \; E_1 = I - 2uu^T \tag{A.3}$$

$$r = p + d_2 w_2 \tag{A.4}$$

From (A.1) and (A.2):

$$d_1 = \frac{b_1 - u^T s}{u^T w_1} = \frac{u^T s - b_1}{\cos\theta} \tag{A.5}$$

From (A.1) and (A.4):

$$r = s + d_1 w_1 + d_2 w_2 = s + d_1(w_1 - w_2) + dw_2 \tag{A.6}$$

so that:

$$d = w_2^T r - w_2^T s + d_1 (1 - w_2^T w_1) \tag{A.7}$$

Using $E_1^{-1} = E_1$, the result is $w_2 = w_1 + 2u \cos\theta$, $1 - w_2^T w_1 = 2\cos\theta$, so that:

$$\begin{aligned} d &= w_2^T r - w_2^T s + 2 d_1 \cos^2\theta \\ &= w_2^T r - w_2^T s + 2(u^T s - b_1)\cos\theta \\ &= w_2^T r - w_2^T E_1 s - 2 b_1 \cos\theta \\ &= w_2^T r - w_1^T s - 2 b_1 \cos\theta \\ &= w_2^T r + c_1 \end{aligned} \tag{A.8}$$

Figure 13:
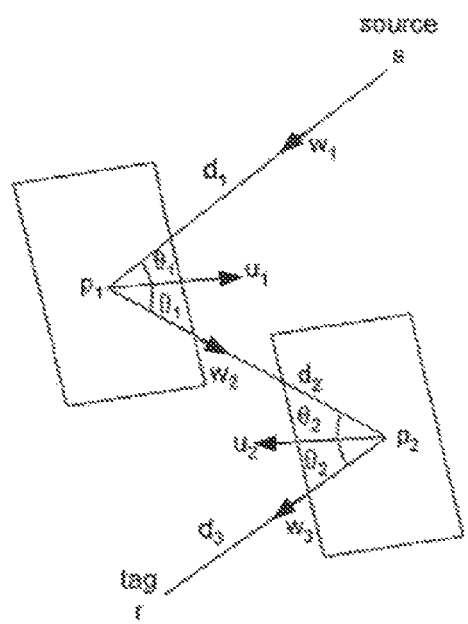
FIG. 13 is another depiction of the geometry for two consecutive specular reflections.

The geometry for two specular reflections is shown in FIG. 13. The equations describing this multipath geometry are:

$$p_1 = s + d_1 w_1, \; p_2 = s + d_1 w_1 + d_2 w_2 \tag{A.9}$$

$$u_1^T p_1 = b_1, \; u_2^T p_2 = b_2 \tag{A.10}$$

$$w_1 = E_1 w_2, \; E_1 = I - 2 u_1 u_1^T \tag{A.11}$$

$$w_2 = E_2 w_3, \; E_2 = I - 2 u_2 u_2^T \tag{A.12}$$

$$r = p_2 + d_3 w_3 \tag{A.13}$$

$$d = d_1 + d_2 + d_3 \tag{A.14}$$

From (A.9) and (A.10):

$$d_1 = \frac{u_1^T s - b_1}{\cos\theta_1}, \tag{A.15}$$

$$d_2 = \frac{u_2^T s - b_2 + d_1 u_2^T w_1}{\cos\theta_2}$$

and from (A.9) and (A.13):

$$\begin{aligned} r &= s + d_1 w_1 + d_2 w_2 + d_3 w_3 \\ &= s + d_1(w_1 - w_3) + d_2(w_2 - w_3) + dw_3 \end{aligned} \tag{A.16}$$

$$\begin{aligned} d &= w_3^T r - w_3^T s + d_1(1 - w_3^T w_1) + d_2(1 - w_3^T w_2) \\ &= w_3^T r - w_3^T s + d_1 \left[(1 - w_3^T w_1) + \frac{u_2^T w_1}{\cos\theta_2}(1 - w_3^T w_2)\right] + \\ & \quad \frac{u_2^T s - b_2}{\cos\theta_2}(1 - w_3^T w_2) \end{aligned} \tag{A.17}$$

From (A.12), and using $E_2^{-1} = E_2$, the result is $w_3 = w_2 + 2 u_2 \cos\theta_2$, $1 - w_3^T w_2 = 2\cos^2\theta_2$. Thus:

$$d = w_3^T r - w_3^T s + d_1(1 - w_3^T w_1 + 2 u_2^T w_1 \cos\theta_2) + 2(u_2^T s - b_2)\cos\theta_2 \tag{A.18}$$

Now letting $w_3 = w_1 + 2 u_1 \cos\theta_1 + 2 u_2 \cos\theta_2$, the result is $1 - w_3^T w_1 = 2\cos^2\theta_1 - 2 u_2^T w_1 \cos\theta_2$, so that:

$$d = w_3^T r - w_3^T s + 2d_1\cos^2\theta_1 + 2(u_2^T s - b_2)\cos\theta_2 \quad (A.19)$$
$$= w_3^T r - w_3^T s + 2(u_1^T s - b_1)\cos\theta_1 + 2(u_2^T s - b_2)\cos\theta_2$$
$$= w_3^T r - (w_3^T - 2u_1^T\cos\theta_1 - 2u_2^T\cos\theta_2)s - 2b_1\cos\theta_1 - 2b_2\cos\theta_2$$
$$= w_3^T r - w_1^T s - 2b_1\cos\theta_1 - 2b_2\cos\theta_2$$
$$= w_3^T r + c_2$$

Based on (A.8) and (A.19), it can be hypothesized that the indirect path length for m specular reflections is:

$$d = w_{m+1}^T r + c_m \quad (A.20)$$

where $$c_m = -w_1^T s - 2b_1\cos\theta_1 - 2b_2\cos\theta_2 - \ldots - 2b_m\cos\theta_m \quad (A.21)$$

This is now demonstrated by induction to be true. The relevant equations are:

$$p_i = s + \sum_{j=1}^{i} d_j w_j; \quad (A.22)$$
$$i = 1, 2, \ldots, m$$

$$u_i^T p_i = b_i; \ i=1, 2, \ldots, m \quad (A.23)$$

$$w_i = E_i w_{i+1}, \ E_i = I - 2u_i u_i^T, \ E_i = E_i^{-1}; \ i=1, 2, \ldots, m \quad (A.24)$$

$$u_i^T w_i = -\cos\theta_i; \ i=1, 2, \ldots, m \quad (A.25)$$

$$r = p_m + d_{m+1} w_{m+1} \quad (A.26)$$

$$d = \sum_{j=1}^{i} d_j; \quad (A.27)$$
$$i = 1, 2, \ldots, m$$

$$w_i^T w_i = 1; \ i=1, 2, \ldots, m+1 \quad (A.28)$$

From (A.22) and (A.26):

$$r = s + \sum_{i=1}^{m+1} d_i w_i \quad (A.29)$$
$$= s + \sum_{i=1}^{m} d_i(w_i - w_{m+1}) + d w_{m+1}. \text{ using (A.27)}$$

Thus:

$$d = w_{m+1}^T r - w_{m+1}^T s + \sum_{i=1}^{m} d_i(1 - w_{m+1}^T w_i) \quad (A.30)$$
$$= w_{m+1}^T r - w_{m+1}^T s + \sum_{i=1}^{m-1} d_i(1 - w_{m+1}^T w_i) + d_m(1 - w_{m+1}^T w_m)$$

From (A.24) and (A.25):

$$w_{i+1} = w_i + 2u_i\cos\theta_i; \ i=1, 2, \ldots, m \quad (A.31)$$

Thus:

$$d = w_{m+1}^T r - w_{m+1}^T s + \sum_{i=1}^{m-1} d_i(1 - w_{m+1}^T w_i) + 2d_m\cos^2\theta_m \quad (A.32)$$

And from (A.22) and (A.23):

$$d_i = \frac{u_i^T s - b_i + \sum_{j=1}^{i-1} d_j u_i^T w_j}{\cos\theta_i}; \ i=1, 2, \ldots, m \quad (A.33)$$

Thus:

$$d = w_{m+1}^T r - w_{m+1}^T s + \sum_{i=1}^{m-1} d_i(1 - w_{m+1}^T w_i) + \quad (A.34)$$
$$2\left[u_m^T s - b_m + \sum_{j=1}^{m-1} d_j u_m^T w_j\right]\cos\theta_m$$
$$= w_{m+1}^T r - w_{m+1}^T s + \sum_{i=1}^{m-1} d_i(1 - w_{m+1}^T w_i + 2u_m^T w_i\cos\theta_m) + 2u_m^T s \cos\theta_m - 2b_m\cos\theta_m$$
$$= w_{m+1}^T r - w_m^T s + \sum_{i=1}^{m-1} d_i(1 - w_m^T w_i) - 2b_m\cos\theta_m. \text{ using (A.31)}$$

Continuing:

$$d = w_{m+1}^T r - w_m^T s + \sum_{i=1}^{m-2} d_i(1 - w_m^T w_i) + \quad (A.35)$$
$$d_{m-1}(1 - w_m^T w_{m-1}) - 2b_m\cos\theta_m$$
$$= w_{m+1}^T r - w_m^T s + \sum_{i=1}^{m-2} d_i(1 - w_m^T w_i) + 2d_{m-1}\cos^2\theta_{m-1} - 2b_m\cos\theta_m$$
$$= w_{m+1}^T r - w_m^T s + \sum_{i=1}^{m-2} d_i(1 - w_m^T w_i) - 2b_m\cos\theta_m + 2\left[u_{m-1}^T s - b_{m-1} + \sum_{j=1}^{m-2} d_j u_{m-1}^T w_j\right]\cos\theta_{m-1}$$
$$= w_{m+1}^T r - w_m^T s + \sum_{i=1}^{m-2} d_i(1 - w_m^T w_i + 2u_{m-1}^T w_i \cos\theta_{m-1}) + 2u_{m-1}^T s\cos\theta_{m-1} - 2b_{m-1}\cos\theta_{m-1} - 2b_m\cos\theta_m$$
$$= w_{m+1}^T r - w_{m-1}^T s + \sum_{i=1}^{m-2} d_i(1 - w_{m-1}^T w_i) - 2b_{m-1}\cos\theta_{m-1} - 2b_m\cos\theta_m.$$

By induction, it is apparent from (A.30), (A.34) and (A.35) that:

$$d = w_{m+1}^T r - w_k^T s + \sum_{i=1}^{k-1} d_i(1 - w_k^T w_i) - 2\sum_{j=k}^{m} b_j \cos\theta_j; \quad (A.36)$$

$$k = 1, 2, \ldots, m+1$$

The case of particular interest is k=1, which gives:

$$d = w_{m+1}^T r - w_1^T s - 2\sum_{j=1}^{m} b_j \cos\theta_j \quad (A.37)$$

and verifies the hypothesis posed in (A.21). Note that the direct path length for any number of reflections may be written as:

$$d = w^T r + c; \quad (A.38)$$

$$c = -w_1^T s - 2\sum_{j=1}^{m} b_j \cos\theta_j$$

where w is the unit vector along the ray from the last reflecting surface and c is a constant that depends on the source location, the unit vector along the ray from the source to the first reflecting plane, all of the reflection angles, and all of the reflecting plane locations.

Equation (A.38) forms the basis of the measurement equations used in the indoor mapping system. It is worth noting that (A.38) is a phenomenological model of the indirect path length that explicitly contains exactly four indirect path parameters {w, c} for any number of reflections. This implies that mapping using indirect path measurements can be accomplished if the four indirect path parameters associated with the current measurement are known or can be estimated with sufficient accuracy. Moreover, the four indirect path parameters are not independent, since w is uniquely defined by two angles. Thus, the phenomenological model of indirect path length actually contains three independent parameters.

To simulate the performance of the indoor mapping system, the full solution associated with all indirect paths is calculated in the simulation. Within the simulation, the tag location r is known, and the locations $\{b_i; i=1, 2, \ldots, m\}$, orientations $\{u_i; i=1, 2, \ldots, m\}$, and sizes of all reflecting surfaces are known. With this information, it is possible to determine the full indirect path solutions under the assumption that the sequence of reflections (i.e., the identity of the reflecting planes in sequence) is known. For the simulations used in the preliminary feasibility analysis, this assumption will always hold. In the more general case, ray tracing (which typically requires considerably more computing resources) may be used.

For one reflection, we have, from (A.3) and (A.6):

$$r = s - 2d_1 u \cos\theta + dw_2 \quad (A.39)$$

$$= E_1 s + 2b_1 u + dw_2. \text{ from (A.5)}$$

The full solution is found as follows. First calculate:

$$d = \|r - E_1 s - 2b_1 u\|, \; w_2 = \text{unit}(r - E_1 s - 2b_1 u) \quad (A.40)$$

Then:

$$\cos\theta = u^T w_2, \; d_1 = \frac{u^T s - b_1}{\cos\theta}, \; w_1 = E_1 w_2, \; p = s + d_1 w_1 \quad (A.41)$$

For two reflections, we have, from (A.11) and (A.16):

$$r = s + d_1(w_1 - w_3) + d_2(w_2 - w_3) + dw_3 \quad (A.42)$$

Setting $w_2 = w_3 = 2u_2 \cos\theta_2$;

$$r = s + d_1(w_1 - w_2 - 2u_2 \cos\theta_2) - 2d_2 \cos\theta_2 u_2 + d\, w_3$$

$$= s + d_1(w_1 - w_2 - 2u_2 \cos\theta_2) - 2(u_2^T s - b_2 + d_1 u_2^T w_1)u_2 + d\, w_3 \text{ from (A.15)}$$

$$= s + d_1(w_1 - w_2 - 2u_2 \cos\theta_2 - 2u_2^T w_1 w_2) - 2(u_2^T s - b_2)u_2 + d\, w_3 \quad (A.43)$$

Then, setting $w_1 = w_2 - 2u_1 \cos\theta_1$:

$$r = E_2 s + d_1[-2u_1 \cos\theta_1 - 2u_2 \cos\theta_2 - 2u_2 u_2^T(w_2 - 2u_1 \cos\theta_1)] + 2b_2 u_2 + dw_3$$

$$= E_2 s + d_1[-2u_1 \cos\theta_1 + 4u_2 u_2^T u_1 \cos\theta_1)] + 2b_2 u_2 + dw_3$$

$$= E_2 s - 2d_1 E_2 u_1 \cos\mu_1 + 2b_2 u_2 + dw_3$$

$$= E_2 s - 2(u_1^T s - b_1) E_2 u_1 + 2b_2 u_2 + dw_3 \text{ from (A.15)}$$

$$= E_2 E_1 s + 2b_1 E_1 u_1 + 2b_2 u_2 + dw_3 \quad (A.44)$$

The full solution for two reflections is found as follows. First calculate:

$$d = \|r - E_2 E_1 s - 2b_1 E_1 u_1 - 2b_2 u_2\| \quad (A.45)$$

$$w_3 = \text{unit}(r - E_2 E_1 s - 2b_1 E_1 u_1 - 2b_2 u_2) \quad (A.46)$$

Then:

$$w_2 = E_2 w_3, \; w_1 = E_1 w_2 \quad (A.47)$$

$$\cos\theta_2 = u_2^T w_3, \; \cos\theta_1 = u_1^T w_2 \quad (A.48)$$

$$d_1 = \frac{u_1^T s - b_1}{\cos\theta_1}, \; d_2 = \frac{u_2^T s - b_2 + d_1 u_2^T w_1}{\cos\theta_2} \quad (A.49)$$

and the specular points are found using (A.9).

For m reflections, the relevant equations are:

$$r = s + \sum_{i=1}^{m} d_i(w_i - w_{m+1}) + dw_{m+1} \quad (A.50)$$

along with (A.31) and (A.33). Then:

$$r = s + \sum_{i=1}^{m-1} d_i(w_i - w_{m+1}) + d_m(w_m - w_{m+1}) + dw_{m+1}$$

-continued $$= s + \sum_{i=1}^{m-1} d_i(w_i - w_{m+1}) - 2u_m d_m \cos\theta_m + dw_{m+1} \text{ using (A.31)}$$

$$= s + \sum_{i=1}^{m-1} d_i(w_i - w_{m+1}) -$$

$$2u_m\left[u_m^T s - b_m + \sum_{i=1}^{m-1} d_i u_m^T w_i\right] + dw_{m+1} \text{ using (A.33)}$$

$$= E_m s + \sum_{i=1}^{m-1} d_i(w_i - w_{m+1} - 2u_m u_m^T w_i) + 2b_m u_m + dw_{m+1}$$

$$= E_m s + \sum_{i=1}^{m-1} d_i(E_m w_i - w_{m+1}) + 2b_m u_m + dw_{m+1}$$

$$= E_m s + E_m \sum_{i=1}^{m-1} d_i(w_i - w_m) + 2b_m u_m + dw_{m+1} \quad (A.51)$$

Continuing:

$$r = E_m s + E_m \sum_{i=1}^{m-2} d_i(w_i - w_m) +$$

$$d_{m-1} E_m(w_{m-1} - w_m) + 2b_m u_m + dw_{m+1}$$

$$= E_m s + E_m \sum_{i=1}^{m-2} d_i(w_i - w_m) -$$

$$2d_{m-1} \cos\theta_{m-1} E_m u_{m-1} + 2b_m u_m + dw_{m+1}$$

$$= E_m s + E_m \sum_{i=1}^{m-2} d_i(w_i - w_m) + 2b_m u_m +$$

$$d w_{m+1} - 2E_m u_{m-1}\left[u_{m-1}^T s - b_{m-1} + \sum_{i=1}^{m-2} d_i u_{m-1}^T w_i\right]$$

$$= E_m E_{m-1} s + E_m \sum_{i=1}^{m-2} d_i(w_i - w_m - 2u_{m-1} u_{m-1}^T w_i) +$$

$$2b_{m-1} E_m u_{m-1} + 2b_m u_m + dw_{m+1}$$

$$= E_m E_{m-1} s + E_m \sum_{i=1}^{m-2} d_i(E_{m-1} w_i - w_m) +$$

$$2b_{m-1} E_m u_{m-1} + 2b_m u_m + dw_{m+1}$$

$$= E_m E_{m-1} s + E_m E_{m-1} \sum_{i=1}^{m-2} d_i(w_i - w_{m-1}) +$$

$$2b_{m-1} E_m u_{m-1} + 2b_m u_m + dw_{m+1}$$

$$= E_m E_{m-1}\left[s + \sum_{i=1}^{m-2} d_i(w_i - w_{m-1})\right] + \quad (A.52)$$

$$2b_{m-1} E_m u_{m-1} + 2b_m u_m + dw_{m+1}$$

From (A.50), (A.51) and (A.52), we have, by induction:

$$r = M_k\left[s + \sum_{i=1}^{k-1} d_i(w_i - w_k)\right] + 2\sum_{i=k}^{m} b_i M_{i+1} u_i + dw_{m+1}; \quad (A.53)$$

$$k = 1, 2, \ldots, m+1$$

where $$M_k = \prod_{i=k}^{m} E_i \quad (A.54)$$

and $M_{m+1} = I$. One case of interest is $k=1$ for which:

$$r = M_1 s + 2\sum_{i=1}^{m} b_i M_{i+1} u_i + d\, w_{m+1} \quad (A.55)$$

The full solution is found as follows. First calculate:

$$d = \| r - M_1 s - 2\sum_{i=1}^{m} b_i M_{i+1} u_i \|, \quad (A.56)$$

$$w_{m+1} = \text{unit}\left(r - M_1 s - 2\sum_{i=1}^{m} b_i M_{i+1} u_i\right)$$

Then calculate:

$$w_i = E_i w_{i+1}, \cos\theta_i = -u_i^T w_i; \, i = m, m-1, \ldots, 1 \quad (A.57)$$

Then the distances $\{d_i; i=1, 2, \ldots, m\}$ can be calculated from (A.33), and the specular points $\{p_i; i=1, 2, \ldots, m\}$ can be calculated using (A.22).

What is claimed is:

1. A method for mapping a structure, the method comprising:
   detecting a plurality of wireless signals that comprise multipath signals that have each experienced at least one reflection against a portion of a structure prior to the detection;
   analyzing the plurality of wireless signals to estimate reflection points for the multipath signals;
   discriminating single-reflection multipath signals from multiple-reflection multipath signals so as to discriminate true reflection points from false reflection points; and
   generating a map of a floor plan of at least the portion of the structure based on the true reflection points.

2. The method according to claim 1, wherein the plurality of wireless signals are received from one or more sources and are detected with at least one receiver.

3. The method according to claim 2, wherein the one or more sources comprise one or more satellites moving in space.

4. The method according to claim 2, wherein the one or more sources comprise at least two transmitters at known terrestrial locations.

5. The method according to claim 2, further comprising:
   causing the at least one receiver to move along a known trajectory within or near the structure.

6. The method according to claim 2, further comprising:
   causing the at least one receiver to move along an unknown trajectory within or near the structure; and
   tracking a location of the at least one receiver.

7. The method according to claim 6, wherein the tracking and the generating take place at substantially the same time and in recursive steps.

8. The method according to claim 1, wherein the analyzing further comprises:
 processing a multipath signal with a Rake filter to correlate the multipath signal with a corresponding direct path signal;
 determining a time delay between the multipath signal and the corresponding direct path signal; and
 estimating one or more parameters associated with a multipath delay model.

9. The method of claim 1, wherein the plurality of wireless signals are transmitted from one or more sources selected from the group consisting of: one or more mobile transmitters and one or more fixed terrestrial transmitters.

10. The method according to claim 1, further comprising: assigning one of the plurality of wireless signals to a corresponding signal path.

11. The method according to claim 1, wherein the analyzing further comprises distinguishing a multipath signal from a corresponding direct-path signal.

12. The method according to claim 1, wherein the analyzing further comprises associating a multipath signal with a corresponding direct-path signal.

13. The method according to claim 1, wherein the generating comprises employing both direct-path signals and multipath signals in the plurality of wireless signals.

14. The method according to claim 1, wherein the analyzing further comprises:
 iteratively estimating one or more multipath parameters associated with a multipath delay model.

15. The method according to claim 14, wherein the one or more multipath parameters for a multipath signal comprise an angle-of-arrival from a last reflection experienced by the multipath signal.

16. The method according to claim 1, further comprising: eliminating one or more erroneous mapping points that result from a proximity effect.

17. A system for mapping a structure, the system comprising:
 a) at least one receiver for detecting a plurality of wireless signals originating from one or more sources, the plurality of wireless signals comprising multipath signals that have each experienced at least one reflection against a portion of a structure prior to the detection; and
 b) a processor, associated with the at least one receiver, for:
  i) analyzing the plurality of wireless signals to estimate reflection points for the multipath signals;
  ii) discriminating single-reflection multipath signals from multiple-reflection multipath signals so as to discriminate true reflection points from false reflection points; and
  iii) generating a map of a floor plan of at least the portion of the structure based on the true reflection points.

18. The system according to claim 17, wherein the one or more sources comprise one or more satellites moving in space.

19. The system according to claim 17, wherein the one or more sources comprise at least two transmitters at known terrestrial locations.

20. The system according to claim 17, wherein the at least one receiver moves along a known trajectory within or near the structure.

21. The system according to claim 17, wherein the at least one receiver moves along an unknown trajectory within or near the structure, and the system being further configured to track a location of the at least one receiver.

22. The system according to claim 21, wherein the tracking of the location of the at least one receiver and the generating of the map take place at substantially the same time and in recursive steps.

23. The system according to claim 17, further comprising a Rake filter for processing a multipath signal in order to correlate the multipath signal with a corresponding direct path signal, and wherein the processor is further configured to i) determine a time delay between the multipath signal and the corresponding direct path signal and ii) estimate one or more parameters associated with a multipath delay model.

24. The system of claim 17, wherein the one or more sources are selected from the group consisting of: one or more mobile transmitters and one or more fixed terrestrial transmitters.

25. The system according to claim 17, wherein the at least one receiver is further configured to assign one of the plurality of wireless signals to a corresponding signal path.

26. The system according to claim 17, wherein the processor is further configured to distinguish a multipath signal from a corresponding direct-path signal.

27. The system according to claim 17, wherein the processor is further configured to associate a multipath signal with a corresponding direct-path signal.

28. The system according to claim 17, wherein the generating of the map is based on both direct-path signals and multipath signals in the plurality of wireless signals.

29. The system according to claim 17, wherein the processor is further configured to iteratively estimate one or more multipath parameters associated with a multipath delay model.

30. The system according to claim 29, wherein the one or more multipath parameters for a multipath signal comprise an angle-of-arrival from a last reflection experienced by the multipath signal.

31. The system according to claim 17, wherein the processor is further configured to eliminate one or more erroneous mapping points that result from a proximity effect.

* * * * *